US008726332B2

(12) United States Patent  
Maegawa et al.

(10) Patent No.: US 8,726,332 B2  
(45) Date of Patent: May 13, 2014

(54) BROADCAST PROGRAMMING DELIVERY APPARATUS, SWITCHER CONTROL METHOD, AND COMPUTER PROGRAM PRODUCT

(75) Inventors: Hideki Maegawa, Kanagawa (JP); Sensaburo Nakamura, Shizuoka (JP)

(73) Assignee: Sony Corporation (JP)

( * ) Notice: Subject to any disclaimer, the term of this patent is extended or adjusted under 35 U.S.C. 154(b) by 1053 days.

(21) Appl. No.: 12/587,989

(22) Filed: Oct. 15, 2009

(65) Prior Publication Data

US 2010/0103325 A1 Apr. 29, 2010

(30) Foreign Application Priority Data

Oct. 27, 2008 (JP) ................................ P2008-276154

(51) Int. Cl.  
*H04N 7/16* (2011.01)

(52) U.S. Cl.  
USPC .......................................... 725/146; 725/144

(58) Field of Classification Search  
None  
See application file for complete search history.

(56) References Cited

U.S. PATENT DOCUMENTS

| 5,115,310 | A | * | 5/1992 | Takano et al. ................. 348/722 |
| 5,470,763 | A | | 11/1995 | Hamada |
| 5,649,171 | A | * | 7/1997 | Craven et al. .................... 703/23 |
| 5,745,126 | A | | 4/1998 | Jain et al. |
| 6,424,789 | B1 | | 7/2002 | Abdel-Mottaleb |
| 6,460,018 | B1 | * | 10/2002 | Kasai et al. ................... 705/7.21 |
| 6,515,303 | B2 | | 2/2003 | Ring |
| 7,786,592 | B2 | | 8/2010 | Trezza |
| 7,834,461 | B2 | | 11/2010 | Asai et al. |
| 2002/0055265 | A1 | | 5/2002 | Ring |
| 2002/0066960 | A1 | | 6/2002 | Ring |
| 2003/0129771 | A1 | | 7/2003 | Summerfelt et al. |
| 2004/0188707 | A1 | | 9/2004 | Kurokawa et al. |
| 2005/0005308 | A1 | | 1/2005 | Logan et al. |
| 2006/0072010 | A1 | | 4/2006 | Haering et al. |
| 2007/0002039 | A1 | | 1/2007 | Pendleton et al. |

(Continued)

FOREIGN PATENT DOCUMENTS

| JP | 07-094746 A | 4/1995 |
| JP | 10-173961 A | 6/1998 |

(Continued)

OTHER PUBLICATIONS

European Search Report EP 10151856, dated Jul. 2, 2010.

(Continued)

*Primary Examiner* — Chenea Smith  
(74) *Attorney, Agent, or Firm* — Lerner, David, Littenberg, Krumholz & Mentlik, LLP

(57) ABSTRACT

A broadcast programming delivery apparatus includes: a broadcast programming delivery control unit that controls broadcast programming delivery based on a broadcast programming delivery program formed of a plurality of items; and a switcher being controlled by the control unit, and a plurality of output channels of a material server having the plurality of output channels for outputting a video material being connected to predetermined input lines of the switcher, wherein the items include control data of the switcher having information for specifying a video material of the material server, and the control unit receives, from the material server, channel material information indicating a video material outputted from each of the output channels, and allows an input bus of the switcher necessary to take an input of a video material to select one of the input lines corresponding to the output channel from which the corresponding video material is outputted.

14 Claims, 29 Drawing Sheets

(56) References Cited

U.S. PATENT DOCUMENTS

| | | |
|---|---|---|
| 2007/0124754 A1* | 5/2007 | Miyauchi et al. ............ 725/8 |
| 2007/0139416 A1 | 6/2007 | Azuma |
| 2008/0068458 A1 | 3/2008 | Carroll |
| 2009/0104738 A1 | 4/2009 | Ring et al. |
| 2009/0184423 A1 | 7/2009 | Erturk et al. |
| 2010/0193914 A1 | 8/2010 | Nakamura |
| 2010/0264548 A1 | 10/2010 | Sanders et al. |
| 2010/0295100 A1 | 11/2010 | Huang et al. |
| 2010/0307582 A1 | 12/2010 | Arai |

FOREIGN PATENT DOCUMENTS

| | | | |
|---|---|---|---|
| JP | 2003250141 | A | 9/2003 |
| JP | 2003333570 | A | 11/2003 |
| JP | 2006060532 | A | 3/2006 |
| JP | 2006312088 | A | 11/2006 |
| JP | 2007-102503 | A | 4/2007 |
| JP | 2007-142580 | A | 6/2007 |
| JP | 2008-048189 | A | 2/2008 |
| JP | 2008-108769 | A | 5/2008 |
| JP | 2008211796 | A | 9/2008 |
| WO | 9510915 | A1 | 4/1995 |
| WO | 0010075 | A1 | 2/2000 |
| WO | 0178050 | A2 | 10/2001 |
| WO | 02071334 | A2 | 9/2002 |
| WO | 2004032516 | A2 | 4/2004 |

OTHER PUBLICATIONS

Office Action from Japanese Application No. 2009-024302, dated Jan. 25, 2011.

* cited by examiner

SELECTED PLACES (THEY ARE LIT)

FIG.12

| No | Start Time | Time Scale | Script | Story Name | | | | | |
|---|---|---|---|---|---|---|---|---|---|
| | Event Title | | Duration | Video | Key | Audio1 | Audio2 | BGM | |
| S | 00:00:00 | | | START | | | | | |
| 1 | 00:00:00 | 00:00 | | Opening | | | | | |
| 2 | 00:00:00 | 00:00 | | Today's News Top3 | | | | | |
| 1 | OTS | | 00:00 | Mix | Mix 0.5 SEC. | SVR News Top3 | | SV | |

EXEMPLARY MODEL DATA STRUCTURE

| NAME | ICON DATA | TYPE | TARGET ID | MEMORY NUMBER | BUS A INPUT | BUS B INPUT | BUS KEY 1 INPUT | ... | ... |
|---|---|---|---|---|---|---|---|---|---|
| (CHARACTER STRING) | ICON DATA (BIT MAP) | SWITCHER | ME1 | SWITCHER MEMORY NUMBER | (NUMBER) | (NUMBER) | (NUMBER) | | |

FIG.15

EXEMPLARY MODEL DATA STRUCTURE

| NAME | ICON DATA | TYPE | TARGET ID | SOUND LEVEL | STEREO MODE |
|---|---|---|---|---|---|
| (CHARACTER STRING) | ICON DATA (BIT MAP) | AUDIO MIXER | (CHANNEL) | (VALUE) | (STEREO/MIX, AND SO ON) |

EXEMPLARY DATA STRUCTURE OF PLAYLIST (BROADCAST PROGRAM DELIVERY PROGRAM)

FIG.17

EXEMPLARY MODEL DATA STRUCTURE

| NAME | (CHARACTER STRING) |
|---|---|
| ICON DATA | ICON DATA(BIT MAP) |
| TYPE | SWITCHER |
| TARGET ID | ME1 |
| MEMORY NUMBER | SWITCHER MEMORY NUMBER |
| BUS A INPUT | (NUMBER) |
| BUS B INPUT | (NUMBER) |
| BUS KEY 1 INPUT | (NUMBER) |

⋮

| ORDINAL NUMBER 1 | BUS B |
|---|---|
| ORDINAL NUMBER 2 | BUS KEY 1 |
| ORDINAL NUMBER 3 | BUS A |

MATERIAL SERVER OUTPUT CHANNEL AND
SWITCHER INPUT NUMBER

| MATERIAL SERVER OUTPUT CHANNEL | SWITCHER INPUT NUMBER |
|---|---|
| A | 5 |
| B | 6 |
| C | 10 |
| D | 11 |
| E | 12 |

FIG.19

EXEMPLARY OUTPUT MATERIAL LIST SENT TO MATERIAL SERVER (NRCS)

| CUE NAME | MATERIAL 1 | MATERIAL 2 | MATERIAL 3 | MATERIAL 4 | MATERIAL 5 |
|---|---|---|---|---|---|
| 30_2Box-2SVR | 3224 | 5683 | 2781 | | |
| 21_SVR-full | 6212 | | | | |

⋮

EXEMPLARY CHANNEL MATERIAL INFORMATION FROM
MATERIAL SERVER (NRCS)

FIG.20A

| FORMATION NAME | OUTPUT CHANNEL | MATERIAL NUMBER |
|---|---|---|
| 30_2Box-2SVR | A | 3 |
| | B | 1 |
| | C | 2 |

FIG.20B

| FORMATION NAME | OUTPUT CHANNEL | MATERIAL NUMBER |
|---|---|---|
| 21_SVR-full | B | 1 |

EXEMPLARY ICONS (WITH NUMBER INDICATION)

(BACKGROUND IS ALSO SERVER MATERIAL)

(SPECIAL EFFECTS CHANNEL INDICATIONS)

(BUS NAME INDICATIONS)

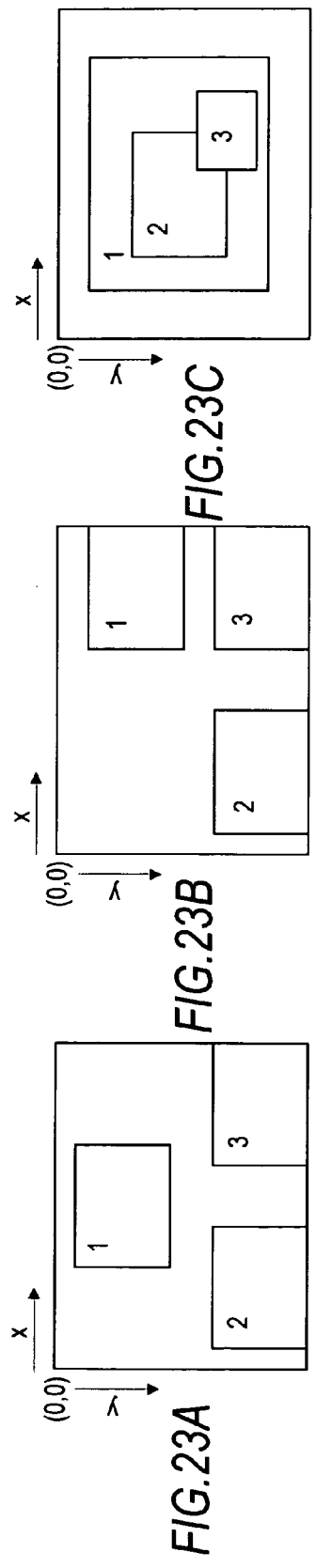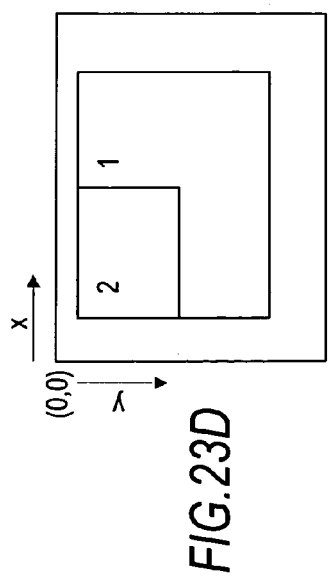
EXEMPLARY ORDINARY NUMBERS FOR PICTURES (BUSES)
FIG.23A
FIG.23B
FIG.23C
FIG.23D

EXEMPLARY OPERATIONS OF INSTALLED PATTERNS

FIG.25

EXEMPLARY STORAGE OF INDIVIDUAL PICTURES (BUSES),
ORDER/ORDINARY NUMBERS OF INSTALLED PATTERNS AND USER PATTERNS

| PATTERN NUMBER | BUS | ORDER/ORDINARY NUMBER |
|---|---|---|
| 1001 | A | 1 |
|  | B | 2 |
|  | – | – |
|  | – | – |
|  | – | – |

⋮

| PATTERN NUMBER | BUS | ORDER/ORDINARY NUMBER |
|---|---|---|
| 3001 | A | 1 |
|  | B | 4 |
|  | Util1 | 2 |
|  | DME-Util | 3 |
|  | – | – |

⋮

| PATTERN NUMBER | BUS | ORDER/ORDINARY NUMBER |
|---|---|---|
| 1911 | A | 1 |
|  | B | 3 |
|  | Util1 | 2 |
|  | – | – |
|  | – | – |

FIG.26

EXEMPLARY GUI WHEN EDITING

PATTERN NUMBER: 1911

BUS ORDER:
1. A
2. B
3. Util1
4. 
5.

UP / DOWN

NRCS RUNDOWN

WHEN CREATED

FIG.27A

| PAGE | AUTOMATION CUE | PLAYOUT SERVER | |
|---|---|---|---|
| | | MATERIAL | DELIVERY CH |
| 100 | 30_2Box-2SVR | 3224 | UNKNOWN |
| 100A | — | 5683 | UNKNOWN |
| 100B | — | 2781 | UNKNOWN |
| 101 | 21_SVR-full | 6212 | UNKNOWN |
| ... | ... | ... | ... |

ON AIR

FIG.27B

| PAGE | AUTOMATION CUE | PLAYOUT SERVER | |
|---|---|---|---|
| | | MATERIAL | DELIVERY CH |
| 100 | 30_2Box-2SVR | 3224 | B |
| 100A | — | 5683 | C |
| 100B | — | 2781 | A |
| 101 | 21_SVR-full | 6212 | B |
| ... | ... | ... | ... |

FIG.28A

CHANNEL MATERIAL INFORMATION

| 100 | |
|---|---|
| DELIVERY CH | MATERIAL |
| A | 2781 |
| B | 3224 |
| C | 5683 |

FIG.28B

| 101 | |
|---|---|
| DELIVERY CH | MATERIAL |
| B | 6212 |

FIG.31
EXEMPLARY MODEL DATA STRUCTURE
(EXAMPLE THAT MATERIAL ID IS STORED)

| ITEM NAME | | DATA DESCRIPTION/CHARACTER STRING |
|---|---|---|
| ICON DATA | | ICON DATA (BIT MAP) |
| TYPE | | SWITCHER |
| TARGET ID | | ME1 |
| MEMORY NUMBER | | SWITCHER MEMORY NUMBER |
| BUS A INPUT | CATEGORY | MAINTAIN |
| | SELECT | — |
| | DETAILS | — |
| BUS B INPUT | CATEGORY | PLAYOUT SERVER1 |
| | SELECT | "Clip Tag 1" |
| | DETAILS | (REPRODUCTION OPTION) |
| BUS UTIL 1 INPUT | CATEGORY | PLAYOUT SERVER1 |
| | SELECT | "Clip Tag 2" |
| | DETAILS | (REPRODUCTION OPTION) |
| BUS KEY 1 INPUT | CATEGORY | DISK RECORDER1 |
| | SELECT | "Title Logo A" |
| | DETAILS | (KEY PARAMETER, REPRODUCTION OPTION) |
| BUS KEY 2 INPUT | CATEGORY | PRIMARY INPUT NUMBER |
| | SELECT | 5 |
| | DETAILS | (KEY PARAMETER) |
| BUS KEY 3 INPUT | CATEGORY | SERVER2 |
| | SELECT | "Animation Fade" |
| | DETAILS | (KEY PARAMETER, REPRODUCTION OPTION) |

EXEMPLARY OUTPUT MATERIAL LIST TO PLAYOUT SERVER 1

| FORMATION NAME | MATERIAL 1 | MATERIAL 2 | MATERIAL 3 | ... |
|---|---|---|---|---|
| Cue-Name-1 | "Clip Tag 1" | "Clip Tag 2" | — | |

EXEMPLARY NAMES OF OUTPUT MATERIAL IN PLAYOUT SERVER 1,
WHICH ARE SET BY MANIPULATING NRCS TERMINAL

| AUTOMATION TAG | MATERIAL TITLE |
|---|---|
| "Clip Tag 1" | "News Town 3/5" |
| "Clip Tag 2" | "Interview B CLIP" |

FIG.34

EXEMPLARY CHANNEL MATERIAL INFORMATION

| FORMATION NAME | OUTPUT CHANNEL | MATERIAL NUMBER |
|---|---|---|
| Cue-Name-1 | A | 2 |
| | B | 1 |
| | C | |

．
．
．

BROADCAST PROGRAMMING DELIVERY APPARATUS, SWITCHER CONTROL METHOD, AND COMPUTER PROGRAM PRODUCT

CROSS-REFERENCE TO RELATED APPLICATION

The present application claims priority from Japanese Patent Application No. JP 2008-276154 filed in the Japanese Patent Office on Oct. 27, 2008, the entire content of which is incorporated herein by reference.

BACKGROUND OF THE INVENTION

1. Field of the Invention

The present invention relates to a broadcast programming delivery apparatus, a switcher control method, and a computer program product. More specifically, the invention relates to a broadcast programming delivery apparatus in which in the case of conducting switcher control based on a broadcast programming delivery program including control data of a switcher having information for specifying a video material in a material server, control data of the switcher is checked against channel material information sent from the material server to conduct input control of the switcher, whereby the apparatus is capable of reliably reproducing picture compositions inputted during pre-production work and implementing automatic control with no misoperations even though a plurality of video materials of the material server is used.

2. Description of the Related Art

Heretofore, as a broadcast programming delivery apparatus used in broadcast stations, such an apparatus is known, in which a broadcast programming delivery control unit controls devices such as a switcher based on a broadcast programming delivery program (playlist: cue sheet) formed of a plurality of items for delivery of broadcast programming (for example, see Patent Document 1 (JP-A-2008-48189)). In this case, devices are controlled item by item in a time series at every specified time of day, or at every time when a trigger is instructed by manual operations (pressing down Take), and a desired broadcasting state is carried out.

A broadcast programming delivery control system is sometimes connected to an NRCS (News Room Control System). To the NRCS and the broadcast programming delivery control system, control target devices of the systems are connected over communication channels. The NRCS and the broadcast programming delivery control system synchronize with each other and operate at the same time or at a predetermined timing to carry out the content of output pictures (broadcast), while communicating with each other and exchanging information.

As an exemplary state of output pictures (broadcast) which are carried out by the broadcast programming delivery control system using a switcher (effect switcher), there is picture in picture (P in P) in which a sub-image is superposed on a background image. For example, it is also called three-picture box in which three sub-images are superposed on a background image. In picture in picture, individual images are supplied from a material server to a switcher.

The material server is controlled by the NRCS. In this case, the NRCS holds material information in a RUNDOWN, and controls the material server to output a desired material from the material server at a desired timing. The material server has a plurality of output channels, and determines from which channel an instructed material is outputted, before starting output. This information, that is, channel material information is sent from the material server to the NRCS with an MOS (Media Object Server) Protocol.

Because the broadcast programming delivery control system obtains channel material information from the NRCS, the broadcast programming delivery control system can determine which channel's output is to be used before using the material to compose an output picture by the switcher. In other words, when an output picture is simply switched, a single material is selected, and it is sufficient to select an input of a switcher receiving the channel to which that material is outputted.

SUMMARY OF THE INVENTION

An operator of the broadcast programming delivery control system creates in advance a broadcast programming delivery program (playlist) that is system control data of a scheduled broadcast, before broadcast programming is started. This creation work is called "pre-production work". Some items of the broadcast programming delivery program include a special effects state such as the three-picture box described above. The operating state of generating these output pictures is reproduced by using a memory function (Snapshot function) of a switcher or an included special effects device. In other words, in execution, the device control state is reproduced by the memory function of these devices.

A method of creating the state like three-picture box is a method in which a switcher selects a pattern incorporated with a control method. As similar to wipe patterns, control that creates a picture composition state often used in any operations is incorporated in an effect switcher from the beginning. Although this method is easy to operate, it is sometimes difficult to carry out the method when the operator desires elaborate pictures.

Another method of creating the state like three-picture box is a method in which individual sub-picture areas are assigned to channels of a special effects device and control parameters of the special effects device are inputted for fine adjustments. Although the operations of this method become difficult, pictures matched with operator's desires can be created. Fine adjustments allow free determinations which channel is positioned at which location on a picture area. In any of these methods, in the switcher, images inputted to three determined buses are resized down according to a special effect. Therefore, when images inputted to these buses are controlled, pictures to be put in three sub-picture areas on three-picture box can be specified.

However, it is not determined yet at the point in time of pre-production work from which channel the material server outputs an instructed material. In this case, it is not a problem when a single image is outputted from the material server for use. However, in picture compositions in which a plurality of input pictures is used like three-picture box, because a plurality of materials is outputted from the material server, correspondences between the output channels of the material server and the individual sub-picture areas are not determined.

Moreover, because the broadcast programming delivery control system uses the memory function of the switcher to call states such as three-picture box for reconstructing these states, it is difficult to determine which bus input of the switcher is positioned at which sub-picture area. On this account, in the past, such manipulations are necessary that the correspondences between a plurality of images and the output channels of the material server in the picture area are manually adjusted with reference to preview outputs, in the operations of broadcasting.

Thus, it is desirable to implement automatic control with no misoperations in which picture compositions inputted in pre-production work are reliably reproduced when a plurality of materials in a material server is used at the same time.

An embodiment of the invention is directed to a broadcast programming delivery apparatus including: a broadcast programming delivery control unit that controls broadcast programming delivery based on a broadcast programming delivery program formed of a plurality of items; and a switcher for video signals, the switcher being controlled by the broadcast programming delivery control unit, and a plurality of output channels of a material server having the plurality of output channels for outputting a video material being connected to predetermined input lines of the switcher, wherein the items of the broadcast programming delivery program include control data of the switcher having information for specifying a video material of the material server, and the broadcast programming delivery control unit receives, from the material server, channel material information indicating a video material outputted from each of the output channels of the material server, and checks, in conducting control of the switcher according to each of the items of the broadcast programming delivery program, control data of the switcher included in the item against the channel material information to obtain a correspondence of each of a plurality of video materials, and allows an input bus of the switcher necessary to take an input of a video material of the material server to select one of the input lines corresponding to the output channel of the material server from which the corresponding video material is outputted.

In the embodiment of the invention, the broadcast programming delivery control unit controls the switcher for video signals based on the broadcast programming delivery program formed of a plurality of items for conducting broadcast programming delivery. The items of the broadcast programming delivery program include control data of the switcher having information for specifying a video material of the material server. The material server has a plurality of output channels from which a video material is outputted, and a plurality of the output channels is connected to predetermined input lines of the switcher.

From the material server, the broadcast programming delivery control unit receives channel material information indicating a video material outputted from the individual output channels of the material server. In this case, in addition to the case in which channel material information is directly sent from the material server, channel material information is sometimes sent from the material server through a news control system, for example. Here, the news control system is connected to the broadcast programming delivery control unit through a communication channel, and conducts management and administration related to a news program. In this case, the material server is controlled from the news control system.

In this case, for example, the broadcast programming delivery control unit may send an output material list that orders each of video materials indicated by information for specifying a video material of the material server included in control data of the switcher, the control data included in each of the items of the broadcast programming delivery program, to the material server for instructing an output schedule of each of the video materials, and the channel material information received by the broadcast programming delivery control unit from the material server may be information indicating a correspondence between the order in the output material list and the output channel. In communications between the broadcast programming delivery control unit and the material server, when rules are to handle a plurality of video materials as listed, because materials are managed in accordance with the listed order to form channel material information, picture compositions inputted in pre-production work can be reliably reproduced.

When the broadcast programming delivery control unit controls the switcher in accordance with each of the items of the broadcast programming delivery program, control data of the switcher included in the item is checked against the channel material information for conducting input control of the switcher. Thus, the input bus of the switcher necessary to take the input of the video material of the material server selects the input line corresponding to the output channel of the material server, from the output channel the video material is outputted.

As described above, control data of the switcher is checked against the channel material information sent from the material server for conducting input control of the switcher, whereby even though a plurality of video materials of the material server is used, picture compositions inputted in pre-production work can be reliably reproduced, and automatic control with no misoperations can be implemented.

In the embodiment of the invention, for example, such a unit may be further included: an editing unit having a function in which an ordinal number is assigned to each of a plurality of video materials of the material server for use at same time for registration in the broadcast programming delivery program and a model of broadcast programming delivery control is provided as a manipulation target for registration of a control state in the broadcast programming control program, wherein control data of the switcher stored in the model for composing a picture with a plurality of video materials of the material server is a data structure that identifies the plurality of the video materials in accordance with an ordinal number, and by the ordinal number, a correspondence between control data of the switcher and the channel material information is obtained. In this case, the correspondences between a plurality of the video materials registered in the broadcast programming delivery program and the video materials in control data of the switcher can be provided in accordance with the ordinal numbers. Thus, the output of the material server, the material specification, and control according to the model can be associated with one another, and picture compositions inputted in pre-production work can be reliably reproduced without mixing up a plurality of materials.

In addition, in the embodiment of the invention, for example, a picture composition resulted from combination obtained by controlling the switcher according to the model may be displayed in a model image, and an arrangement of a plurality of video materials used for a picture composition on a picture area is displayed by indicating an ordinal number in a model image. In this case, when an operator registers a control state in the broadcast programming delivery program as the model is a manipulation target, the operator can easily recognize the relation between the video material and the model handled in the broadcast programming delivery program, and the ease of manipulation is improved.

In addition, in the embodiment of the invention, for example, a model creating unit that creates the model may be further included, wherein the model creating unit uses a coordinate value by which a video material of the material server is arranged on a picture area to sort each of video materials, and determines an ordinal number of each of the video materials. Thus, even though a plurality of the video materials is handled, the operator can easily grasp the arrangement of each of the video materials on the picture area by intuition, and the ease of manipulation is improved.

In addition, in the embodiment of the invention, for example, such units may be further included: an editing unit having a function in which an ordinal number is assigned to each of a plurality of video materials of the material server for use at same time for registration in the broadcast programming delivery program, and a model of broadcast programming delivery control is provided as a manipulation target for registration of a control state in the broadcast programming control program; and a model creating unit that creates the model, wherein the broadcast programming delivery control unit assigns an ordinal number to each input bus used in the switcher in advance as corresponding to each of special effects patterns instructed to the switcher, when creating a model including specification of a special effects pattern, the model creating unit considers that the assigned ordinal number corresponding to the pattern is an ordinal number of each of video materials selected by the input bus, and for an item of the broadcast programming delivery program including the model, a correspondence between control data of the switcher and the channel material information is obtained by the ordinal number. In this case, in preparing a model using a special effects pattern installed in the switcher to edit the broadcast programming delivery program, the operator memorizes the order of the video materials for every type of the special effects patterns, whereby the operator can grasp the roles of the individual materials in special effects, and the ease of manipulation is improved.

In addition, in the embodiment of the invention, for example, such units may be further included: a bus number storage unit that stores an ordinal number assigned to each input bus used in the switcher for each of special effects patterns instructed to the switcher, and a bus number editing unit that edits details of storage of the bus number storage unit. When a special effects pattern installed in the switcher is used in each model, or when a special effects pattern created by the operator is used, the ordinal number of each input bus for each of special effects is inputted in accordance with operator's preferences, and the ordinary number is an ordinal number of the corresponding material used in the model. Thus, in preparing a model using a special effects pattern to edit the broadcast programming delivery program, the operator memorizes the order of materials for each of types of special effects patterns, whereby the operator can grasp the roles of the individual materials in special effects, and the ease of manipulation is improved.

In addition, in the embodiment of the invention, for example, such units may be further included: an editing unit that provides a model of broadcast programming delivery control as a manipulation target to register a control state in the broadcast programming control program; and a model creating unit that creates the model, wherein control data of the switcher stored in the model for composing a picture with a plurality of video materials of the material server is a data structure including an identifier of each of the plurality of the video materials. In this case, such a data structure is formed that the model itself includes information (identifier) for specifying the material, editing the broadcast programming delivery program that repeatedly uses picture compositions using the same material is facilitated. In addition, in this case, the output of the material server, the material specification, and control according to the model can be associated with one another, and picture compositions inputted in pre-production work can be reliably reproduced without mixing up a plurality of materials.

In addition, in the embodiment of the invention, for example, software may be further included, which is operated on the news control system, wherein the broadcast programming delivery control unit has a broadcast programming delivery program holding unit that holds the broadcast programming delivery program, and the software has an edit function that makes access to the broadcast programming delivery program holding unit to update the broadcast programming delivery program held in the broadcast programming delivery program holding unit. For example, software makes access to the broadcast programming delivery program holding unit, and registers a control state of broadcast programming delivery stored in the model, in response to manipulation that selects and adds the model. In this case, by a terminal device (news control system) capable of making a manipulation such as management of the materials of the material server and acquisition and deletion of materials, the broadcast programming delivery program can be edited at the same time, and pre-production work for picture compositions using a plurality of video materials is also made possible. Thus, the ease of manipulation can be improved, and picture compositions inputted in pre-production work can be reliably reproduced.

According to the embodiment of the invention, when the switcher is controlled based on the broadcast programming delivery program including control data of a switcher having information for specifying a video material of the material server, control data of the switcher is checked against the channel material information sent from the material server for conducting input control of the switcher. Even though a plurality of video materials of the material server is used, picture compositions inputted in pre-production work can be reliably reproduced, and automatic control with no misoperations can be implemented.

In addition, according to the embodiment of the invention, when the broadcast programming delivery program is efficiently edited by using a model, a plurality of video materials of the material server for use in the model can be associated with each portion of picture compositions as designs made in pre-production, the ease of manipulation can be improved, and automatic control with no misoperations can be implemented.

BRIEF DESCRIPTION OF THE DRAWINGS

FIG. 12 is a diagram depicting a playlist in which SVR is set;

FIG. 14 is a diagram depicting an exemplary model data structure;

FIG. 15 is a diagram depicting another exemplary model data structure;

FIG. 17 is a diagram depicting another exemplary model data structure;

FIG. 18 is a diagram depicting correspondences between output channels of a material server and input numbers of the switcher;

FIG. 19 is a diagram depicting an exemplary output material list sent from the first computer unit to the material server;

FIGS. 20A and 20B are diagrams depicting exemplary channel material information sent from the material server to the first computer unit;

FIGS. 23A to 23D are diagrams illustrative of exemplary ordering of sub-picture areas;

FIG. 25 is a diagram depicting exemplary storage of pictures (buses) of installed patterns and user patterns and order/ordinal numbers;

FIG. 26 is a diagram depicting exemplary GUI display to allow an operator to input order of pictures for a user pattern;

FIGS. 27A and 27B are diagrams partially depicting a RUNDOWN (NRCS RUNDOWN) in a second computer unit (NRCS PC);

FIGS. 28A and 28B are diagrams depicting exemplary channel material information indicating the correspondences between materials and output channels in individual pages sent from the second computer unit (NRCS PC) to the first computer unit (Automation Ctrl PC);

FIG. 31 is a diagram depicting another exemplary model data structure;

FIG. 32 is a diagram depicting an exemplary output material list sent from the first computer to a playout server (playout server 1);

FIG. 33 is a diagram depicting exemplary titles of actual output materials in the playout server 1 set by manipulations of the second computer unit (NRCS PC); and FIG. 34 is a diagram depicting exemplary channel material information sent to the first computer unit.

DESCRIPTION OF THE PREFERRED EMBODIMENTS

Hereinafter, the best mode for implementing an embodiment of the invention (hereinafter, referred to as an "embodiment") will be described. In addition, the descriptions will be provided in the order below.

1. Embodiment
2. Exemplary modification

Figure 1:
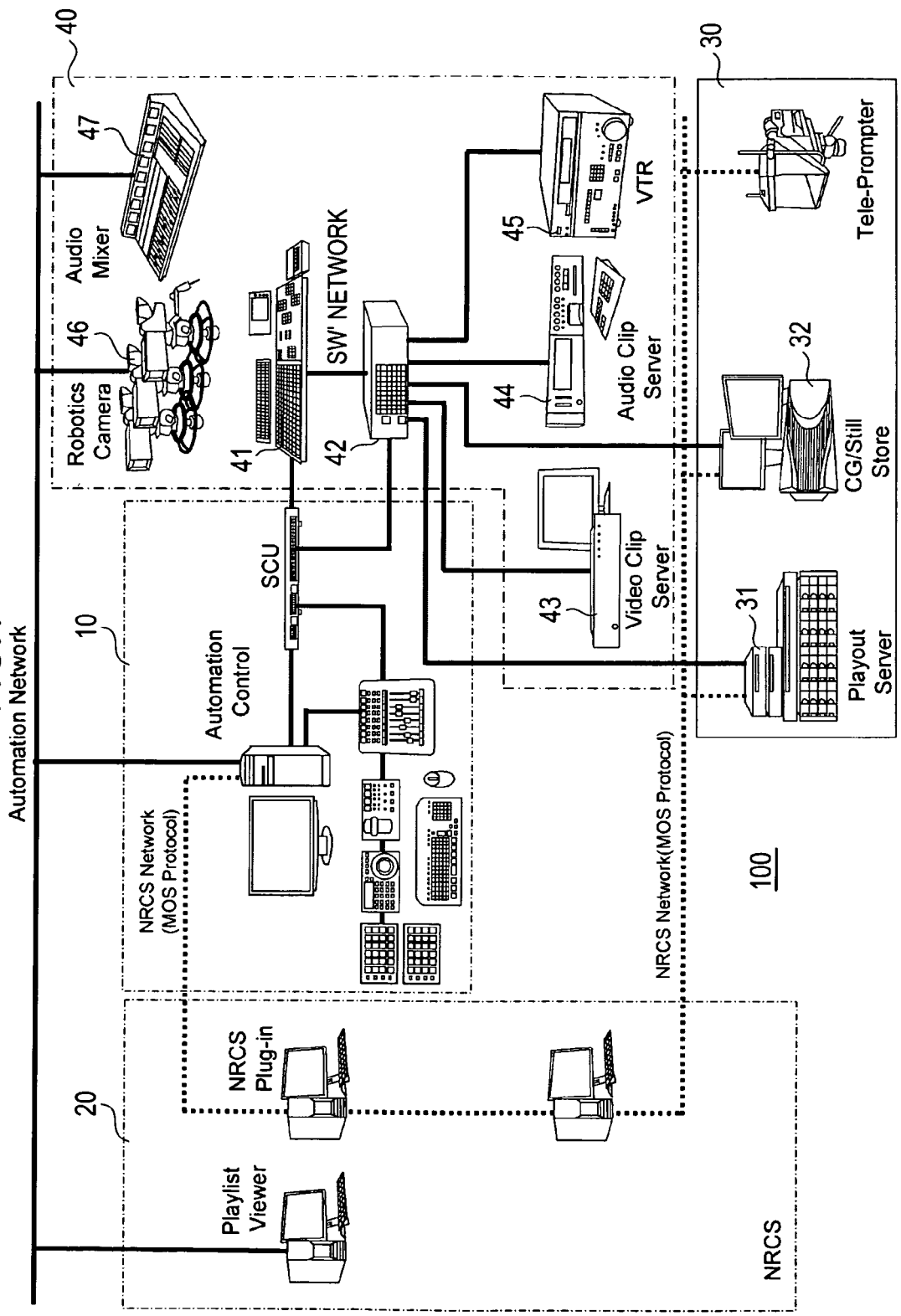
FIG. 1 is a block diagram depicting an exemplary configuration of a broadcast programming delivery control system as an embodiment of the invention.

1. Embodiment 1-1. Exemplary Configuration of a Broadcast Programming Delivery Control System FIG. 1 shows an exemplary configuration of a broadcast programming delivery control system 100 as an embodiment. This broadcast programming delivery control system 100 has an automation control block 10, a news room control system (NRCS) block 20, an MOS device block 30, and an automation control device block 40.

The control block 10 controls broadcast programming delivery based on a playlist (cue sheet) formed of a plurality of configurations. Here, the playlist configures a broadcast programming delivery program, and individual cues (individual formations) of the playlist correspond to individual items of the broadcast programming delivery program. The NRCS block 20 conducts management and administration related to news programs such as arrangements for gathering information, placing orders of materials, and making formations of broadcast programming. In the MOS (Media Object Server) device block 30, a playout server 31, a CG/still store 32, and other units are arranged, which are networked to the NRCS block 20 (according to MOS Protocol). In the control device block 40, a switcher 41, a device control unit (DCU) 42, a video clip server 43, and an audio clip server 44 are arranged, which are connected to the control block 10. In addition, in the control device block 40, a video tape recorder (VTR) 45, a robotics camera (Robotics Camera) 46, and an audio mixer 47 are arranged.

The NRCS block 20 is connected to the control block and to the MOS device block 30 through an NRCS network according to the MOS protocol. The MOS protocol is a protocol for remotely controlling a video system server installed in a news room from the NRCS, and allowed to have original extended tags based on XML (Extensible Markup Language).

On an NRCS client, an automation plug-in (NRCS Plug-in) and a playlist viewer are installed. To the individual MOS devices in the MOS device block 30, the device control unit 42 in the automation control device block 40 issues an on-air timing by triggers such as Tally/GPI.

Here, the playout server 31 is a video server that stores materials changed and replaced everyday, which is demanded to have advanced functions because the playout server is used for editing. In addition, the playout server 31 has playlists and a MOS interface. It is necessary that the playout server 31 quickly conducts feeding and editing materials, and thus a server of higher performance than that of the video clip server 43 is often used for the playout server 31. In addition, depending on types of the playout server 31, because it is difficult to continuously use the same channel for outputting different materials, channel assignment control in consideration of this point is necessary.

Figure 2:
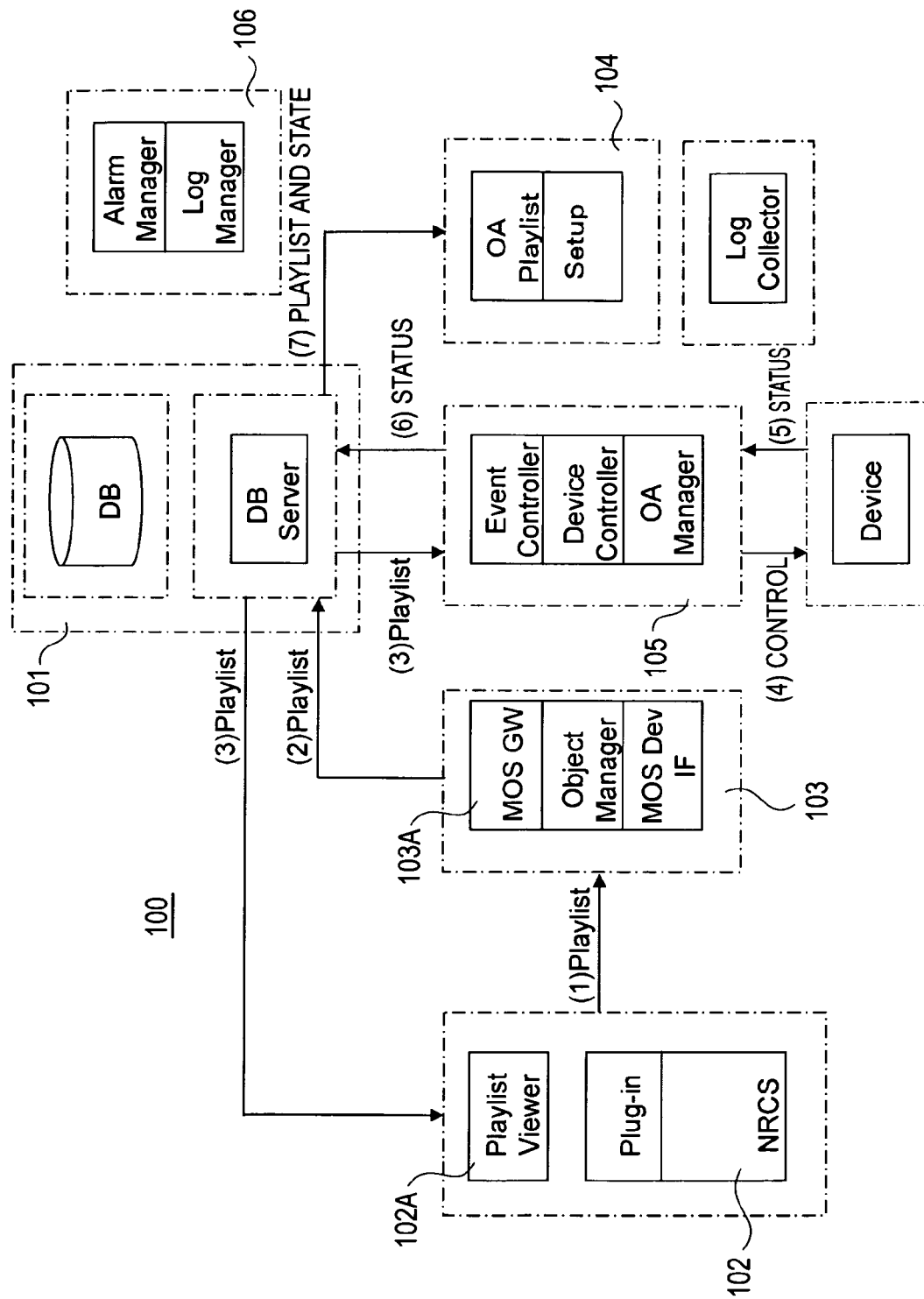
FIG. 2 is a diagram depicting an exemplary configuration of software blocks of the broadcast programming delivery control system.

1-2. Exemplary Configuration of Software Blocks of the Broadcast Programming Delivery Control System FIG. 2 shows an exemplary configuration of software blocks of the broadcast programming delivery control system 100. In other words, the broadcast programming delivery control system 100 has a database (DB) unit 101, an NRCS plug-in/playlist viewer unit 102, and an NRCS interface (NRCS IF) unit 103. In addition, the broadcast programming delivery control system 100 has an on-air playlist/setup unit 104, a device controller unit 105, and a log/alarm manager unit 106. In the broadcast programming delivery control system 100, the individual units construct an automation system.

Automation is TDA (Technical Director Assist) software on a computer unit, which controls devices including the switcher under the NRCS. On the other hand, a server in the automation system also has playlists. Generally, a producer (P) produces an overall news program, and a technical director (TD) conducts the assignment and setting of devices in individual stories in the program. It is the automation system that assists the technical director to control devices. The playlist is a list that holds the detail of progress of a news program in a time series.

In the automation system, playlist data is created by the NRCS of the NRCS plug-in/playlist viewer unit 102 (1), and through a MOS gateway (MOS GW) 103A of an NRCS interface unit 103, the playlist data is sent to the database unit 101 (2). Then, the playlist data is stored in a database (DB) of the database unit 101.

The playlist data is displayed on a playlist viewer (Playlist Viewer) 102A of the NRCS plug-in/playlist viewer unit 102, and sent to a device control unit 105 when a program is on the air (3). The devices are controlled to go on the air in accordance with the playlist (4), and the device statuses are notified to the database (DB) of the database unit 101 (5) and (6). Then, the playlist and the device statuses are sent to the on-air playlist/setup unit 104, and displayed (7). A log or warning is generated in the automation system, and sent to the log/alarm manager unit 106.

1-3. Exemplary Implementation of the Software Blocks of the Broadcast Programming Delivery Control System The individual software blocks in the automation system can be split and installed into individual personal computers for each software block, and a scalable system can be offered as matched with customer's system resizes.

Figure 3:
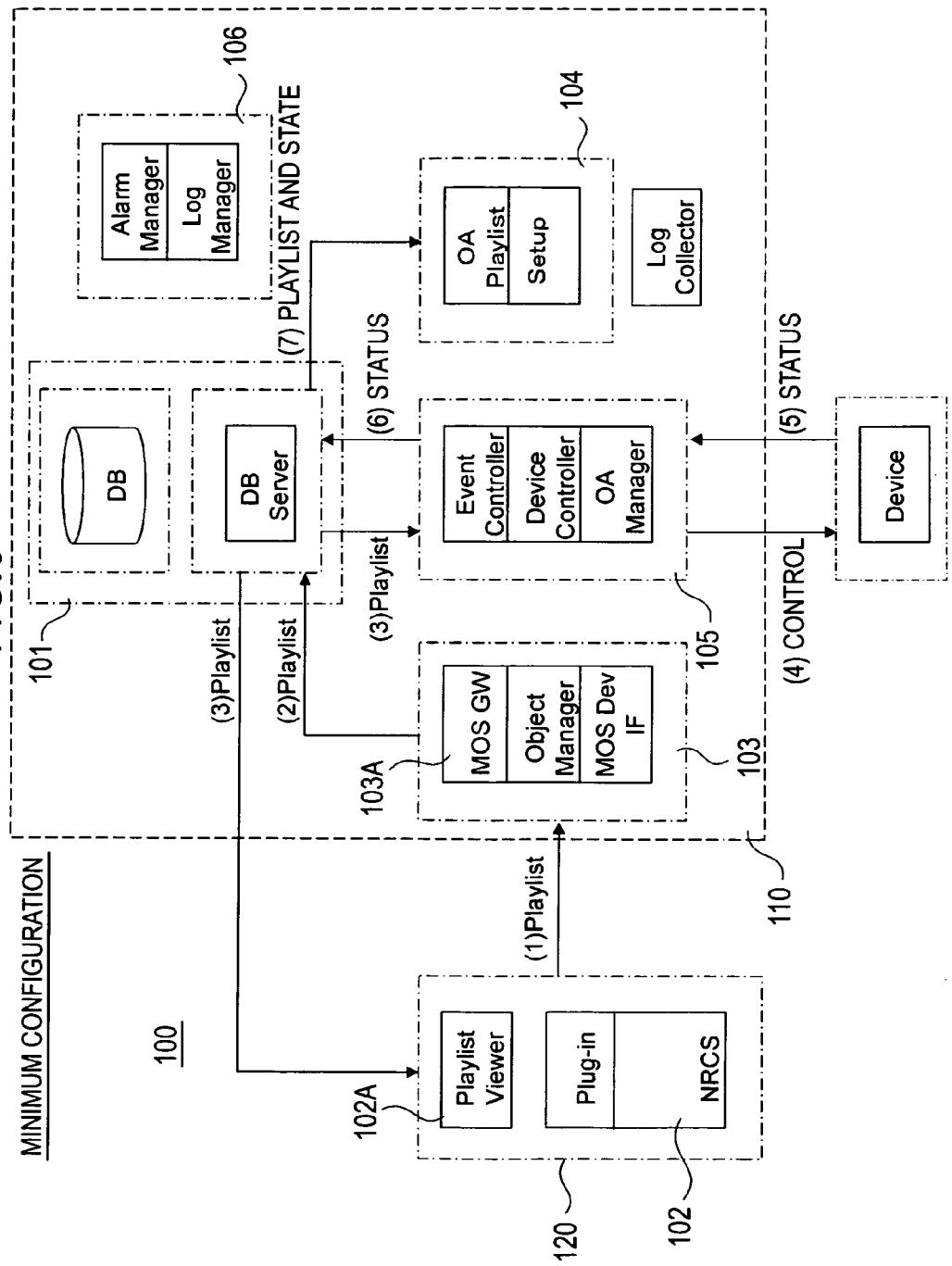
FIG. 3 is a diagram depicting an exemplary implementation of the software blocks of the broadcast programming delivery control system.

FIG. 3 shows an exemplary implementation of the software blocks of the broadcast programming delivery control system 100. In this exemplary implementation, the database unit 101, the NRCS interface unit 103, the on-air playlist/setup unit 104, the device control unit 105, and the log/alarm manager unit 106 are installed in a single computer unit 110. In addition, the NRCS plug-in/playlist viewer unit 102 is installed in a customer's computer unit 120 in which an NRCS client is installed.

Figure 4:
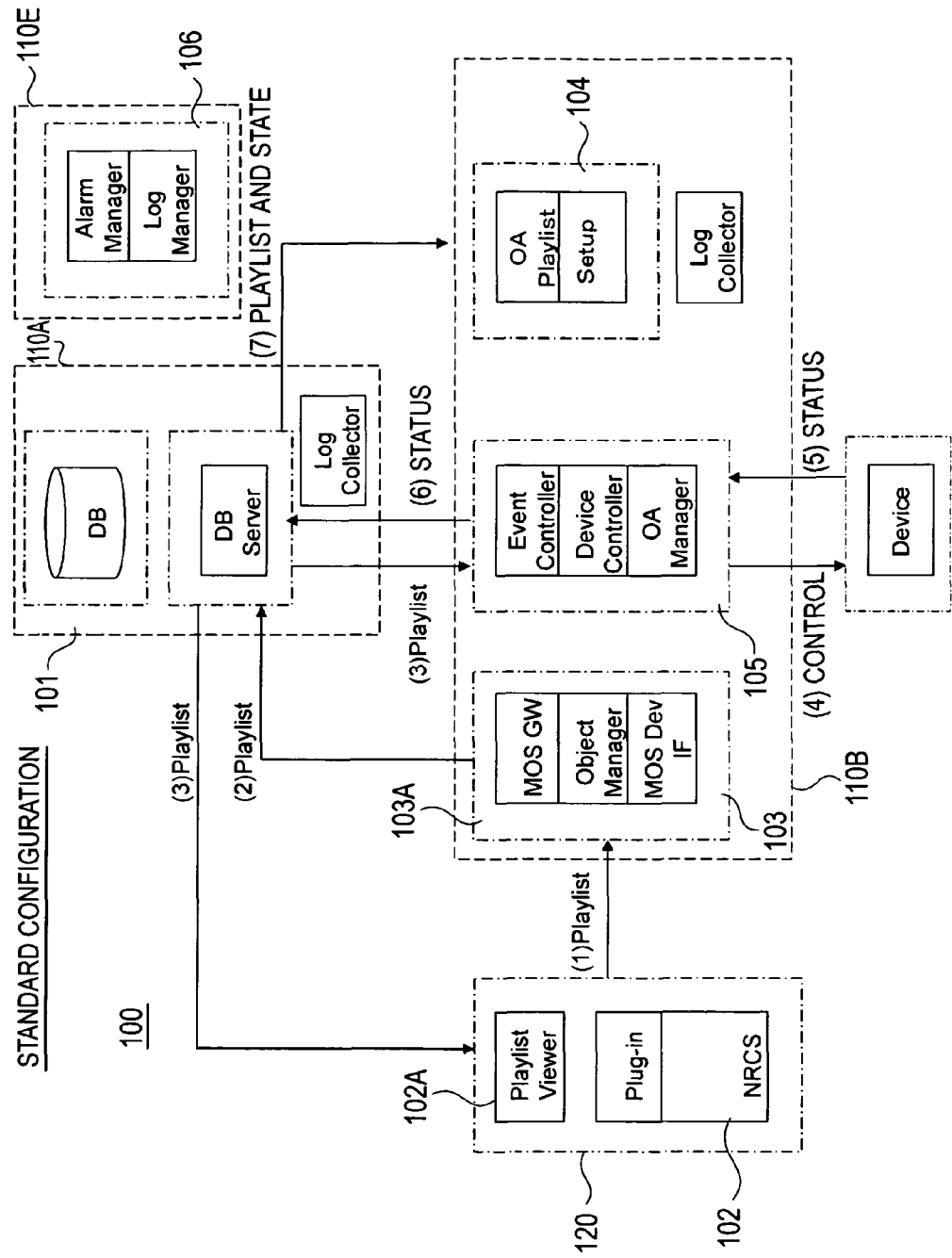
FIG. 4 is a diagram depicting another exemplary implementation of the software blocks of the broadcast programming delivery control system.

FIG. 4 shows another exemplary implementation of the software blocks of the broadcast programming delivery control system 100. In this exemplary implementation, the database unit 101 is installed in a single computer unit 110A. In addition, the log/alarm manager unit 106 is installed in a different computer unit 110E. Moreover, the NRCS interface unit 103, the on-air playlist/setup unit 104, and the device control unit 105 are installed in a different computer unit 110B. In addition, the NRCS plug-in/playlist viewer unit 102 is installed in the customer's computer unit 120 in which the NRCS client is installed.

Figure 5:
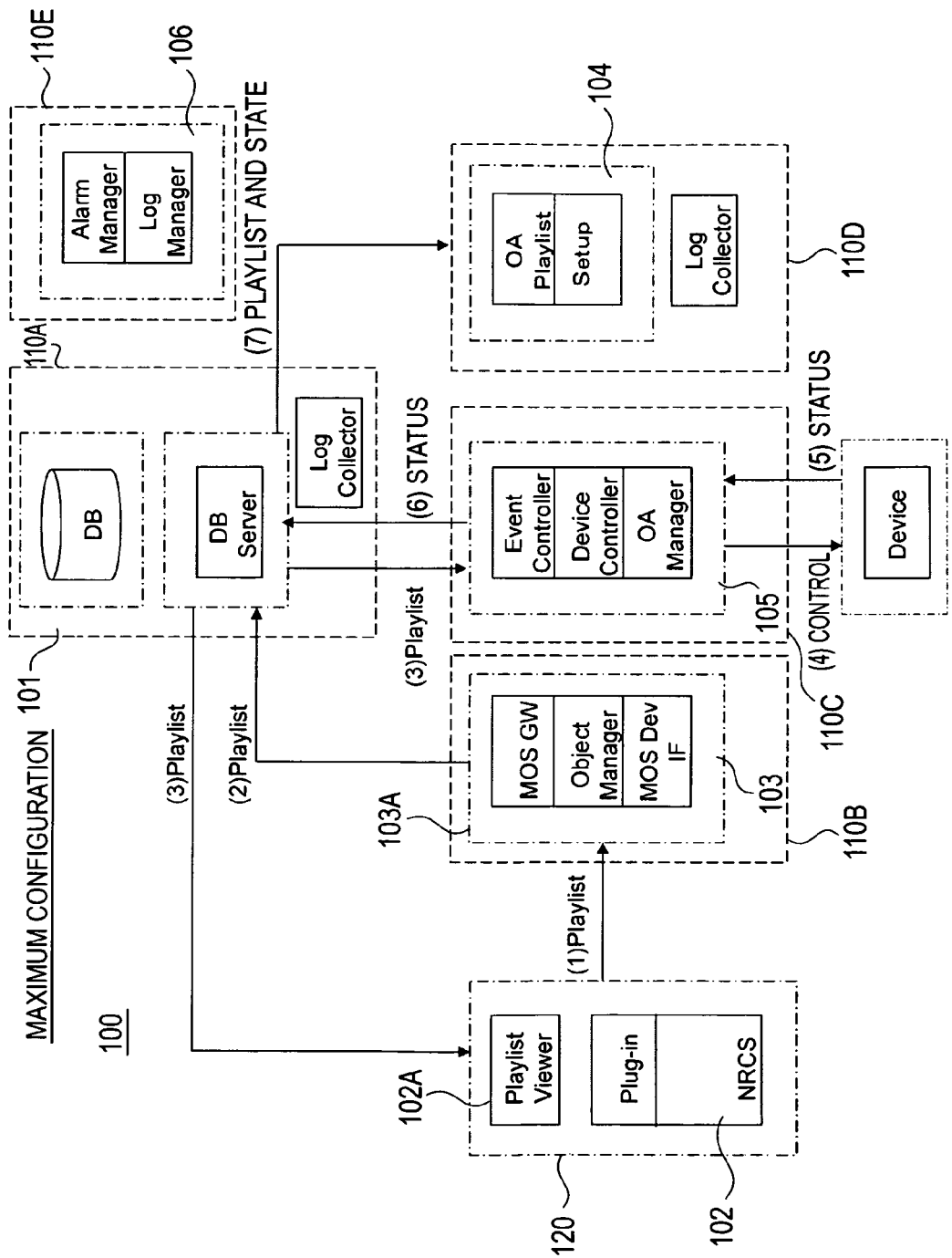
FIG. 5 is a diagram depicting still another exemplary implementation of the software blocks of the broadcast programming delivery control system.

FIG. 5 shows still another exemplary implementation of the software blocks of the broadcast programming delivery control system 100. In this exemplary implementation, the database unit 101 is installed in a single computer unit 110A. In addition, the log/alarm manager unit 106 is installed in a different computer unit 110E. Moreover, the NRCS interface unit 103, the on-air playlist/setup unit 104, and the device control unit 105 are installed in separate computer units 110B, 110C, and 110D. In addition, the NRCS plug-in/playlist viewer unit 102 is installed in the customer's computer unit 120 in which the NRCS client is installed.

As discussed above, the log/alarm manager unit 106 is installed in the standalone computer unit 110E, whereby independence can be provided to detection of abnormal systems. In addition, the database unit 101 is installed in the standalone computer unit 110E, whereby the degree of freedom can be provided to the database system configuration.

Figure 6:
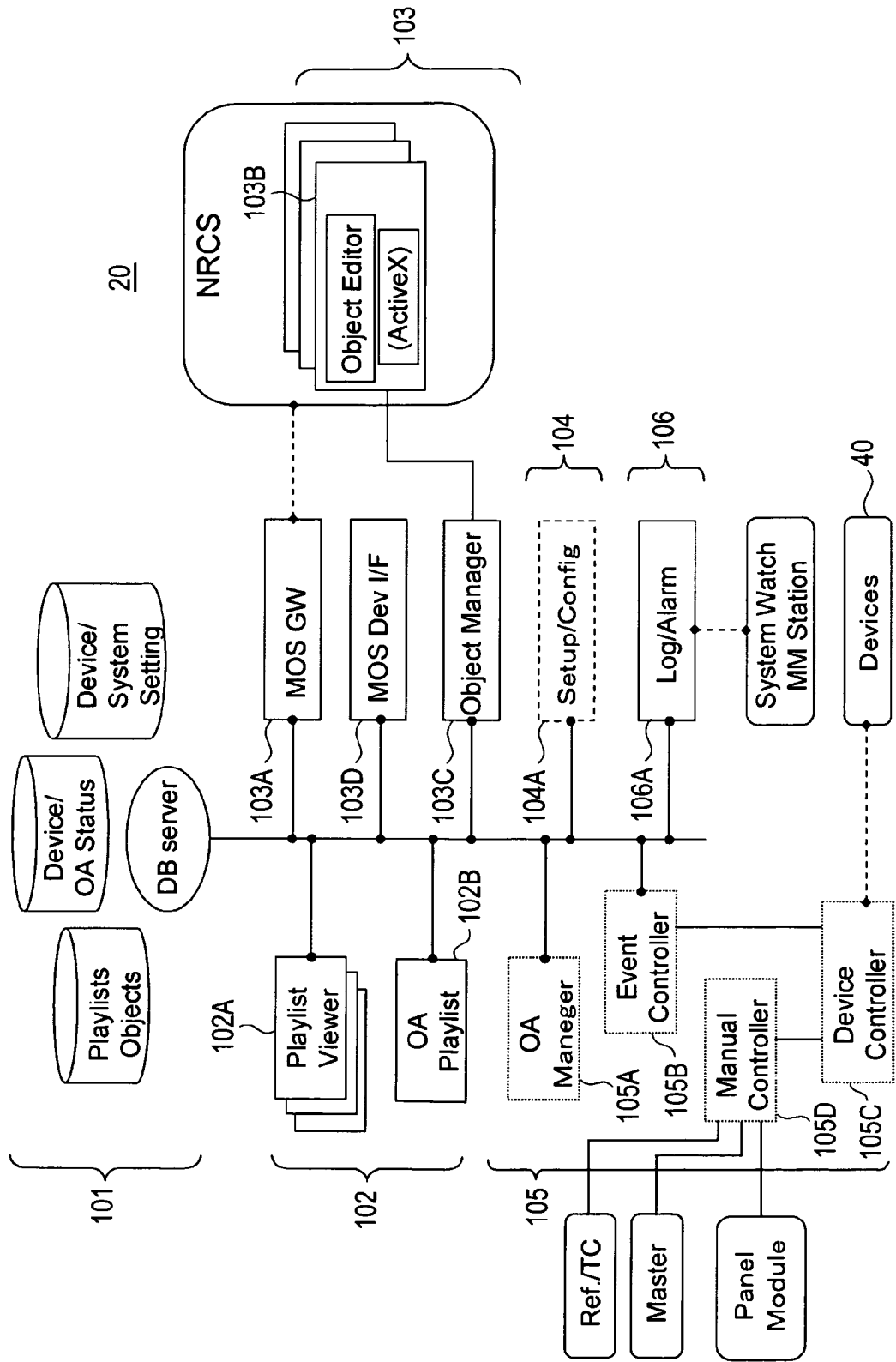
FIG. 6 is a diagram depicting an exemplary block configuration of a database server (DB Server) of a database unit and units around the DB server in an automation system.

1-4. Detailed Block Configuration of the Database Server and Units Around It Here, the detailed block configuration of the database server (DB Server) of the database unit 101 and units around it in the automation system will be described. FIG. 6 shows an exemplary block configuration of the database server and units around it.

The NRCS interface unit 103 includes the MOS gateway (MOS GW) 103A, an object editor (Object Editor) 103B, an object manager (Object Manager) 103C, and a MOS device interface (MOS Device I/F) 103D.

The MOS gateway 103A communicates with the NRCS block 20 according to the MOS protocol, and updates the database unit 101. In other words, the MOS gateway 103A receives a RUNDOWN (Running Order) from the NRCS block, and converts the RUNDOWN into a playlist and writes it in the database unit 101.

The object editor 103B makes setting to objects of devices connected to the automation system. Here, the devices connected to the automation system are the switcher 41, the audio mixer 47, the robotics camera 46, the video clip server 43, and other units. The object editor 103B is activated from the NRCS block 20, and displays, creates, and changes objects on the database. In addition, the object editor 103B exchanges objects with the database unit 101 through the object manager 103C.

The object manager 103C manages objects edited by the object editor 103B, reads objects out of the database unit 101, and writes objects in the database unit 101. The MOS device interface 103D acquires information such as the status of the MOS device and channel assignments, and writes the information in the database unit 101.

In addition, the NRCS plug-in/playlist viewer unit 102 graphically displays a created playlist, or the state of a playlist on the air. The NRCS plug-in/playlist viewer unit 102 includes the playlist viewer 102A that displays an automation playlist and an on-air playlist (OA Playlist) 102B that displays a playlist on the air.

The playlist viewer 102A displays the detail of a playlist created and changed in the NRCS block 20. The on-air playlist 102B displays and manages the progress of a playlist going on the air. The on-air playlist 102B displays a playlist on the air, and displays the current on-air position. In addition, the on-air playlist 102B displays the standby situations of video and audio materials. Moreover, the on-air playlist 102B specifies subsequent items/formations.

The device control unit 105 controls various devices based on a playlist through consoles (CCP for MVS, and JL Cooper Modules). The device control unit 105 includes an on-air manager (OA Manager) 105A, an event controller 105B, a device controller 105C, and a manual controller (Manual Controller) 105D.

The on-air manager 105A manages on air broadcasting. In other words, the on-air manager 105A notifies activation to the device control unit 105 by manipulations of activating and finishing a playlist, and conducts standby and finishing processes of a playlist.

The event controller 105B executes a single event in a playlist. In other words, the event controller 105B instructs the device controller 105C about operations necessary at the next standby time, based on a playlist on the database unit 101.

In addition, the event controller 105B instructs a series of operations conducted when on air (TAKE). In other words, the event controller 105B sends an on-air timing (Take Trigger) to the device controller 105C. In this case, the event controller 105B sends an on-air timing to the device controller 105C by creating and sending a symbolic command/time line.

In addition, the event controller 105B stores device statuses in the database unit 101.

The manual controller 105D generates an on-air timing (Take Trigger) manually, by notification from a master (Master Switcher), or according to time. In addition, the manual controller 105D conducts assignable event/device control by a utility/shot box module. In addition, the manual controller 105D conducts control necessary for playlist execution such as TAKE manipulations and dialogues. In addition, the manual controller 105D executes temporary events by quick recall. Moreover, the manual controller 105D controls devices independently.

The device controller 105C controls devices. In other words, the device controller 105C interprets an abstracted symbolic command, and transforms it into a predetermined protocol to control devices. In addition, the device controller 105C transforms the protocol into an abstracted status, and notifies it to the event controller 105B. In addition, the device controller 105C holds the time line of the symbolic command, and controls synchronization by an on-air timing (Take Trigger).

The on-air playlist/setup unit 104 makes settings of the automation core system and configurations of control devices by a setup/configuration 104A. The log/alarm manager unit 106 collects various logs and alarms scattered to individual terminals by a log/alarm manager 106A, and when a trouble occurs, the log/alarm manager unit 106 notifies it to an SNMP manager. The database unit 101 collectively manages information such as playlists, events, settings, and statuses.

Figure 7:
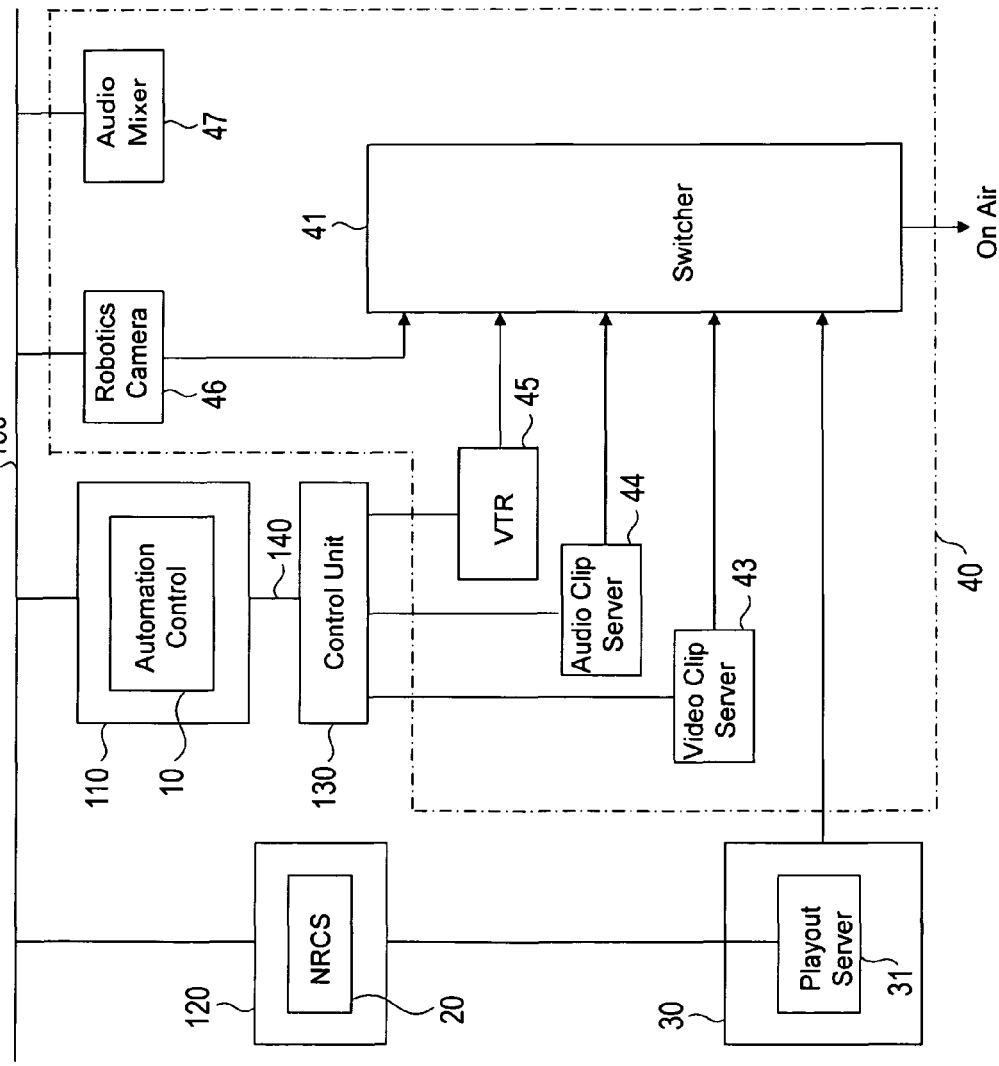
FIG. 7 is a diagram depicting an exemplary configuration of essential units of the broadcast programming delivery control system.
Figure 8:
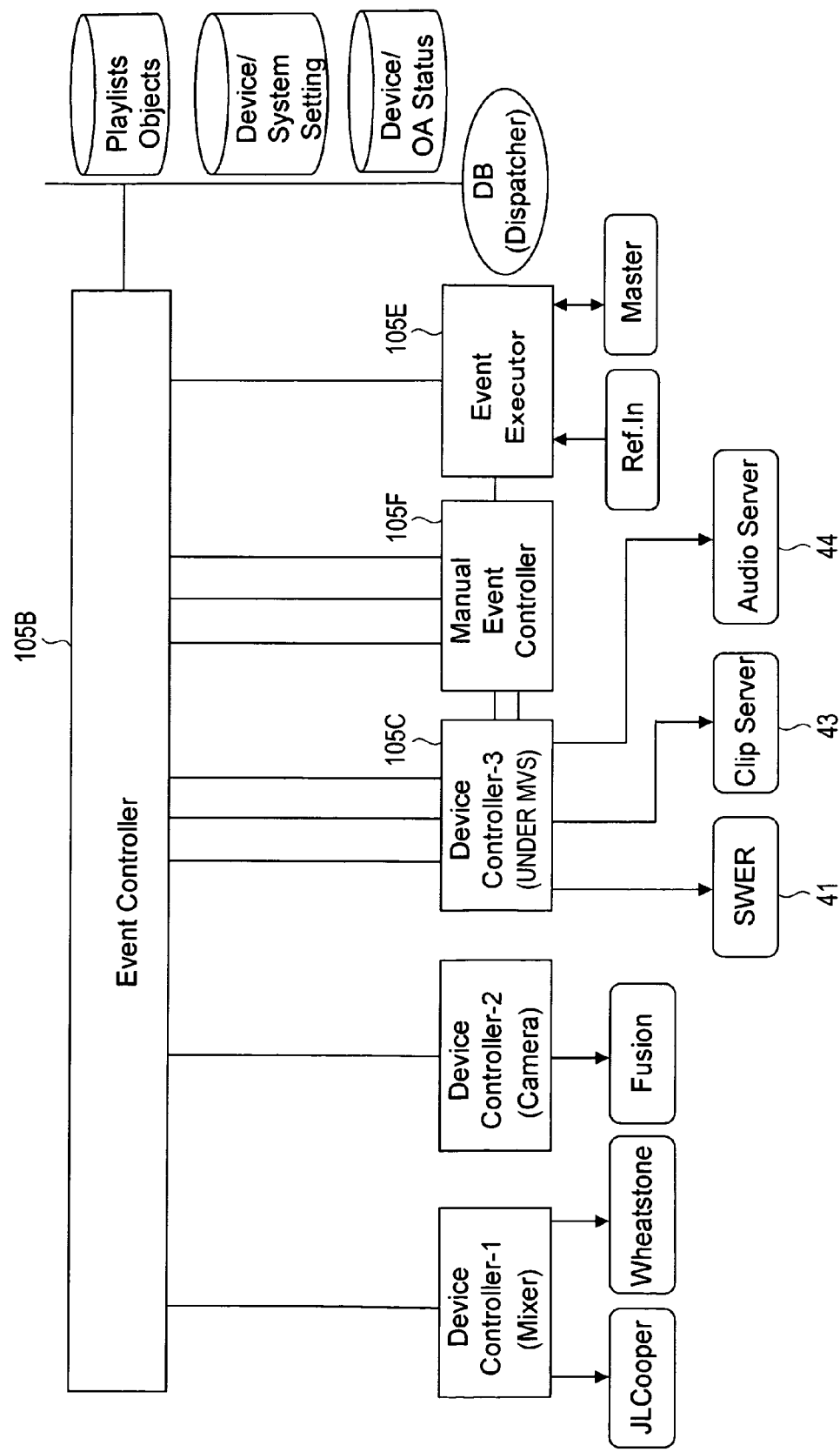
FIG. 8 is a diagram depicting an exemplary configuration of essential software modules in the broadcast programming delivery control system.

1-5. Configurations of Essential Units of the Broadcast Programming Delivery Control System 100, and Configurations of Essential Software Modules FIG. 7 shows an exemplary configuration of essential units of the broadcast programming delivery control system 100. In addition, FIG. 8 shows an exemplary configuration of essential software modules in the broadcast programming delivery control system 100.

In other words, the broadcast programming delivery control system 100 has the automation control block 10 and the NRCS block 20. The automation control block 10 controls programmed broadcast programming delivery based on the software blocks installed in the first computer unit (Automation Ctrl PC) 110. The NRCS block 20 conducts management and administration related to a news program such as arrangements for gathering information, placing orders of materials, and making formations of broadcast programming, based on the software blocks installed in the second computer unit 120.

In addition, the broadcast programming delivery control system 100 has the MOS device block 30 formed of MOS devices such as the playout server 31, and the CG/still store 32. The MOS device block 30 is networked to the second computer unit 120.

In addition, the broadcast programming delivery control system 100 has the automation control device block 40 formed of the switcher 41, the device controller (DCU) 42, the video clip server 43, the audio clip server 44, the VTR 45, the robotics camera 46, and the audio mixer 47. The automation control device block 40 is networked to the first computer unit 110.

In addition, the broadcast programming delivery control system 100 has a control unit (SCU) 130 having a video reference input. In addition, the broadcast programming delivery control system 100 has a communication channel 140 connecting between the control unit 130 and the first computer unit 110, and a network 150 networking the first computer unit 110 to the second computer unit 120.

On the control unit 130, an event executer 105E is mounted, which is an execution and management module sending a video signal reference (Ref. In) to the first computer unit 110 through the communication channel 140.

On the first computer unit 110, a software module that manages playlist information and a device driver software module in conformity to video devices to be controlled are mounted. In addition, on the first computer unit 110, an event execution module is mounted. The event execution module has a software interface capable of adding a device driver software module, and a software interface to a device control module in the control unit 130.

The event executer 105E is a software module operated by a microcomputer of the control unit 130. Ref. In is a reference input, and reference signals (for example, black burst signals) of the entire equipment are supplied to the control unit 130. The control unit 130 is configured to interrupt the built-in microcomputer by the reference signals at one-field intervals.

When this interrupt occurs, the event executer 105E notifies the other software module on the same microcomputer, for example, a manual event controller 105F about that. At the same time, the event executer 105E also notifies the first computer unit (automation Ctrl PC) 110 through the communication channel 140. More specifically, the event executer 105E is in a wait state for tasks. The event executer 105E receives a wait cancelation from an interrupt process routine by the reference signal to again start to run a task for the above-described process, and then enters the wait state again when finishing it.

The manual event controller 105F receives an interrupt notification to organize several processes at one-field intervals. For example, the control unit 130 has a push button to control the switcher. The manual event controller 105F sends the event that the push button has been pressed as a command to the switcher 41 that is the automation control device in the automation control device block 40 through the communication channel.

This transmission is conducted at one-field intervals, whereby no delay occurs in control, and degraded efficiency can be avoided because of very frequent communications. The manual event controller 105F accumulates information about the pressed button, forms information in a command format as one field of press-down information by interrupt notification, and then sends it to the switcher 41. In addition, the manual event controller 105F sends the command to the switcher 41 as well as sends information about the pressed button to the first computer unit (automation Ctrl PC) 110.

The event controller 105B that is a software module in the first computer unit (automation Ctrl PC) 110 controls execution of control events for various devices in accordance with playlist information. The progress of the playlist is conducted according to time code. The event controller 105B receives notification from the control unit 130 at one-field intervals, whereby the event controller 105B can control the progress with the use of this notification as clock information. When the system is operating according to interlacing, because two fields make one frame, receiving two notification increases time code by one.

When time code reaches a predetermined position (time position) in the playlist, the operation at this position is executed. Here, suppose that the device controller that is the software module on the first computer unit 110 is considered to be a first device controller, and the device controller that is the software module on the control unit 130 is considered to be a second device controller. The event controller 105B sends an instruction in accordance with the playlist to at least any one of the first device controller and the second device controller.

Both of the device controllers transform the instruction into a native protocol of a device to be controlled (control protocol of each device), and sends it from individual ports (RS422, and Ethernet (registered trademark)).

A device controlled by an interface that a PC does not generally has, such as RS422 or a dedicated LAN, can be connected to DCU42 for control, DCU42 covering the port unit of the control unit 130. On the other hand, a device connected to a multipurpose Ethernet can be connected to the PC for similar control.

The device controller (second device controller) on the control unit 130 synchronizes with reference signals for control, in order to control the switcher (Switcher) 41 and the video tape recorder 45 in the automation control device block 40. Consequently, in the broadcast programming delivery control system 100, a device controlled from the first computer unit (automation Ctrl PC) 110 side can be synchronized with the control unit 130 side for operation.

It is unnecessary to provide hardware to receive reference signals in the first computer unit (automation Ctrl PC) 110, and the communication channel according to Ethernet is used, whereby costs can be suppressed. In addition, flexible configurations as shown in FIGS. 3, 4, and 5 are feasible, and multipurpose products can be used in replacing the computer unit, which is economical.

The control unit 130 conducts transformation into a native protocol of the device connected to the control unit 130. On this account, loads are not concentrated on the first computer unit (automation Ctrl PC) 110 side, and loads are distributed to economically execute device control with no delay in synchronization with reference signals.

In FIG. 8, the master connected to the event executor 105E is a master switcher. The master switcher is a switching apparatus at higher level than the switcher and this system in a broadcast station, and the master switcher allocates video signals in the overall broadcast station, while this system belongs to a specific studio.

The control unit (SCU) 130 receives instructions and timings from the master (Master) through a port such as a GPI (General Purpose Interface). The GPI is the port to receive instructions and triggers in response to reception of simple ons/offs in a parallel port. The master switches outputs from the station to studio outputs or CM. In switching from a CM to a studio output, the automation receives a trigger from the GPI to start the formations after the CM. In this case, the master takes the initiative of switching. Conversely, such an operation may be possible that a frame called "CM" is provided in a formation, a trigger is given to the master from the studio by a GPI output in the reverse direction, and then the master switches to a CM.

In addition, the event executor 105E relays among the master switcher, the other software module, and the first computer unit (automation Ctrl PC) 110. It is necessary to assure that delay in relay does not exceed a defined field unit. To this end, when the operation is started at the timing according to the reference signal, a GPI input is read. When the level is changed, it is determined what instruction is made in accordance with the setting of the GPI port, and a notification is made to the other software module and/or to the first computer unit (automation Ctrl PC) 110 correspondingly.

When an output is made from the GPI, the event executor 105E processes the instruction received from the other software module and the first computer unit (automation Ctrl PC) 110 in units of fields. In other words, when the operation is started at the timing according to the reference signal, the event executor 105E organizes the received instructions to change the level of GPI output in accordance with the settings of the individual GPI ports.

The event executor 105E has a plurality of processes to conduct at the timing according to the reference signals. Executing every field is essential to reduce the delay in this execution to one field or below (two fields or below from reception to completion of transmission). The upper limit of delay can be ensured even though the order during the process is not strictly defined.

In FIG. 6, a Microsoft SQL Server can be used as a data server of the database unit 101. When a certain application rewrites the database unit 101, the data server uses an MS SQL function to notify the other application of a changed item. This is called a dispatcher. Properly speaking, the individual applications resister items desired to notify, receive change notification, and then reads the database unit 101. When alteration is made in a formation after the current point in time in a playlist, or the order of formations is changed, the first computer unit 110 uses this function to prepare change in control.

As described above, in the broadcast programming delivery control system 100, the control unit 130 having the reference input sends a timing for reference to the first computer unit 110. Then, the event executor 105E receives this timing for reference, and controls the device driver software module in the first computer unit 110 and the device control module in the control unit 130.

Thus, in the broadcast programming delivery control system 100, video devices having various control operations interfaces can be controlled in synchronization with the timing for reference in accordance with the playlist, and delivery control can be implemented at accurate timings also in conjunction with the NRCS block 20.

1-6. Configuration of the Switcher

Figure 9:
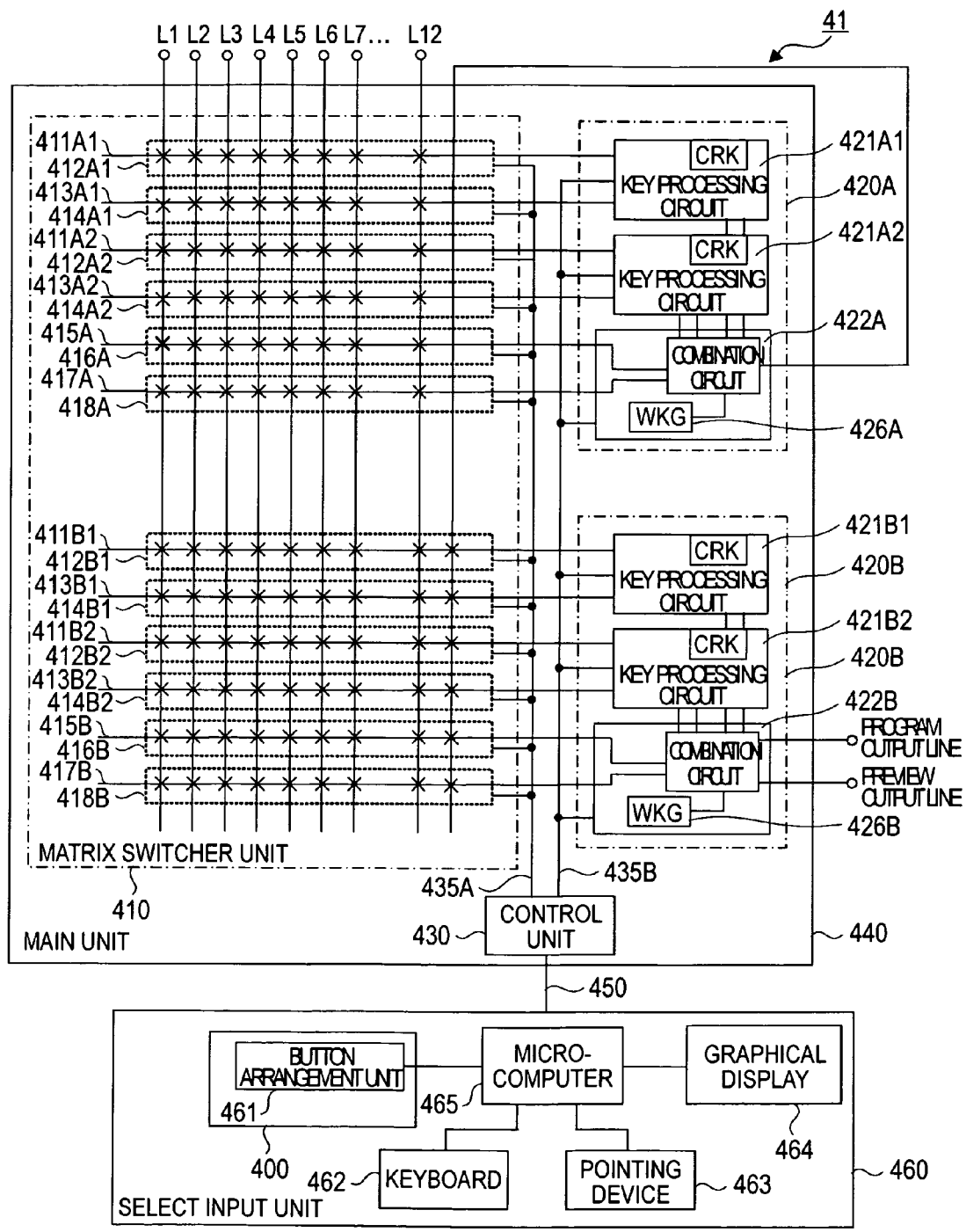
FIG. 9 is a diagram depicting an exemplary configuration of a switcher.

Next, the switcher 41 will be described. FIG. 9 shows an exemplary configuration of the switcher 41. The switcher 41 has a main unit 440, and a select input unit 460 connected to the main unit 440 through a communication channel 450. The main unit 440 has a matrix switcher unit 410, a first image processing unit 420A, a second image processing unit 420B, and a control unit 430. The first image processing unit 420A and the matrix switcher unit 410 corresponding to this configure a first ME bank. In addition, the second image processing unit 420B and the matrix switcher unit 410 corresponding to this configure a second ME bank.

The matrix switcher unit 410 selects video signals inputted to input lines L1 to L12. To the first image processing unit 420A and the second image processing unit 420B, video signals inputted to the input lines L1 to L12 are supplied through the matrix switcher unit 410. The control unit 430 controls the operations of the matrix switcher unit 410, the first image processing unit 420A, and the second image processing unit 420B.

To the input lines L1 to L12 of the switcher 41, video signals to be key source signals or key fill signals and video signals to be background video signals are inputted. The matrix switcher unit 410 has key source cross-points 412A1 and 412A2. The key source cross-points 412A1 and 412A2 are formed of switches connected to key source signal select input buses 411A1 and 411A2 that supply one of video signals inputted to the input lines L1 to L12 as a key source signal to the first image processing unit 420A.

In addition, the matrix switcher unit 410 has key fill cross-points 414A1 and 414A2. The key fill cross-points 414A1 and 414A2 are formed of switches connected to key fill signal select input buses 413A1 and 413A2 that supply one of video signals inputted to the input lines L1 to L12 as a key fill signal to the first image processing unit 420A.

In addition, the matrix switcher unit 410 has first background cross-points 416A. The first background cross-points 416A are formed of switches connected to a first background signal select input bus 415A that supplies one of video signals inputted to the input lines L1 to L12 as a first background signal to the first image processing unit 420A. In addition, the matrix switcher unit 410 has second background cross-points 418A. The second background cross-points 418A are formed of switches connected to a second background signal select input bus 417A that supplies one of video signals inputted to the input lines L1 to L12 as a second background signal to the first image processing unit 420A.

In addition, the matrix switcher unit 410 has key source cross-points 412B1 and 412B2. The key source cross-points 412B1 and 412B2 are formed of switches connected to key source signal select input buses 411B1 and 411B2 that supply one of video signals of the input lines L1 to L12 and output lines of the first ME bank as a key source signal to the second image processing unit 420B.

In addition, the matrix switcher unit 410 has key fill cross-points 414B1 and 414B2. The key fill cross-points 414B1 and 414B2 are formed of switches connected to key fill signal select input buses 413B1 and 413B2 that supply one of video signals of the input lines L1 to L12 and output lines of the first ME bank as a key fill signal to the second image processing unit 420B.

In addition, the matrix switcher unit 410 has first background cross-points 416B. The first background cross-points 416B are formed of switches connected to a first background signal select input bus 415B that supplies one of video signals inputted to the input lines L1 to L12 and output lines of the first ME bank as a first background signal to the second image processing unit 420B. In addition, the matrix switcher unit 410 has second background cross-points 418B. The second background cross-points 418B are formed of switches connected to a second background signal select input bus 417B that supplies one of video signals inputted to the input lines L1 to L12 and output lines of the first ME bank as a second background signal to the second image processing unit 420B.

The first image processing unit 420A is formed of key processing circuits 421A1 and 421A2 and a combination circuit 422A. The key processing circuits 421A1 and 421A2 are connected to the key source signal select input buses 411A1 and 411A2 and the key fill signal select input buses 413A1 and 413A2. To the key processing circuits 421A1 and 421A2, a key source signal and a key fill signal selected from video signals inputted to the input lines L1 to L12 are inputted through the key source signal select input buses 411A1 and 411A2 and the key fill signal select input buses 413A1 and 413A2. The key processing circuits 421A1 and 421A2 generate a key signal corresponding to a control signal from the control unit 430 by the inputted key source signal or by an incorporated waveform generation circuit (wipe pattern generation circuit). Then, the key processing circuits 421A1 and 421A2 supply a key signal and a key fill signal to the combination circuit 422A.

The combination circuit 422A is connected to the key processing circuits 421A1 and 421A2 as well as connected to the first background signal select input bus 415A and the second background signal select input bus 417A. To the combination circuit 422A, the key signal and the key fill signal are inputted from the key processing circuits 421A1 and 421A2. In addition, to the combination circuit 422A, a first background signal and a second background signal selected from the video signals inputted to the input lines L1 to L12 are inputted through the first background signal select input bus 415A and the second background signal select input bus 417A. The combination circuit 422A selectively uses the key signal and the key fill signal supplied from the key processing circuit 421A1 or the key processing circuit 421A1 under control conducted by the control unit 430. Then, the combination circuit 422A conducts a keying process in which the area indicated by the key signal is replaced by the first background signal or the second background signal to combine a key fill signal under control conducted by the control unit 430.

The second image processing unit 420B is formed of key processing circuits 421B1 and 421B2 and a combination circuit 422B. The key processing circuits 421B1 and 421B2 are connected to the key source signal select input buses 411B1 and 411B2, and the key fill signal select input buses 413B1 and 413B2. To the key processing circuits 421B1 and 421B2, a key source signal and a key fill signal selected from video signals of the input lines L1 to L12 and output lines of the first ME bank are inputted through the buses 411B1 and 411B2 and the key fill signal select input buses 413B1 and 413B2. The key processing circuits 421B1 and 421B2 generate a key signal corresponding to a control signal from the control unit 430 by the inputted key source signal or by an incorporated waveform generation circuit (wipe pattern generation circuit). Then, the key processing circuits 421B1 and 421B2 supply a key signal and a key fill signal to the combination circuit 422B.

The combination circuit 422B is connected to the key processing circuits 421B1 and 421B2 as well as connected to the first background signal select input bus 415B and the second background signal select input bus 417B. To the combination circuit 422B, a key signal and a key fill signal are inputted from the key processing circuits 421B1 and 421B2. To the combination circuit 422B, a first background signal and a second background signal selected from video signals of the input lines L1 to L12 and output lines of the first ME bank are inputted through the first background signal select input bus 415B and the second background signal select input bus 417B. The combination circuit 422B selectively uses a key signal and a key fill signal supplied from the key processing circuit 421B1 or the key processing circuit 421B1 under control conducted by the control unit 430. Then, the combination circuit 422B conducts a keying process in which the area indicated by the key signal is replaced by the first background signal or the second background signal to combine a key fill signal under control conducted by the control unit 430.

In the descriptions above, the description is made in which the key signal is binary signals and the background signal or the key fill signal is specified. However, actually, the key signal is not binary signals, and the concentration of laying the key fill signal on the background signal is shown by multiple values. Therefore, such image processing can be also conducted in which a portion having the key fill signal semi-transparently seen is provided while the background is viewed.

The control unit 430 is configured of a microcomputer, for example. The control unit 430 generates a control signal corresponding to a select input signal given from the select input unit 460 thorough the communication channel 450, and controls the individual operations of the matrix switcher unit 410, the first image processing unit 420A, and the second image processing unit 420B through control lines 435A and 435B.

The select input unit 460 is formed of a microcomputer 465 to which a button arrangement unit 461, a keyboard 462, a pointing device 463 such as a mouse, and a graphical display 464 are connected. When the buttons of the button arrangement unit 461 are manipulated to select input, in the matrix switcher unit 410 of the main unit 440, the cross-points connected to the corresponding input bus are controlled to select input, and a video signal is supplied to the corresponding image processing unit. Then, video signals are processed such as image synthesis specified in the image processing unit, and video signals to form a picture area including the video signal of the selected input are outputted.

In addition, in the case of dual link mode in which video signals of progressive mode are processed in pairs, image paths are provided in pairs to be doubled on A side and B side and operations are made such that paired inputs are selected on each of A side and B side.

In the switcher 41 shown in FIG. 9, the select input unit 460 communicates with the control unit 430 of the main unit 440 through the communication channel 450 to instruct execution of various processes. The combination circuit 422A receives inputs of the background signals from the first background signal select input bus 415A and the second background signal select input bus 417A, and uses any one of the background signals for the keying process to form a background signal in accordance with the instruction from the select input unit 460. Alternatively, the combination circuit 422A combines two background signals at the instructed ratio to form a background signal used for the keying process in accordance with the instruction from the select input unit 460.

The ratio is manually instructed by a fader lever of the select input unit, or in the case of operations of automatic transition (automatic progress), the ratio is changed over time, and controlled such that one of the background signals is switched to the other background signal. As one example of the combination method, for example, there is a method in which two background signals are weighted and added for each pixel at the above-described ratio. For instance, suppose that the ratio is 30%, the value that the value of the first background signal is multiplied by 0.3 is added to the value that the value of the second background signal is multiplied by 0.7.

In addition, as another example of the combination method, there is a method in which a second background signal is superimposed on a first background signal with a wipe key signal supplied from a wipe key generator (WKG) by keying. The key signal generated in the wipe key generator is changed with the above-described ratio, and the key signal is generated such that the time of day of the progress is used as an input parameter to determine the boundary line of wipe in the case of automatic transition. In the case in which it is not automatic transition, the instructed ratio is used to generate the key signal instead of time of day. The descriptions above are the same in the case of the combination circuit 422B.

Figure 10:
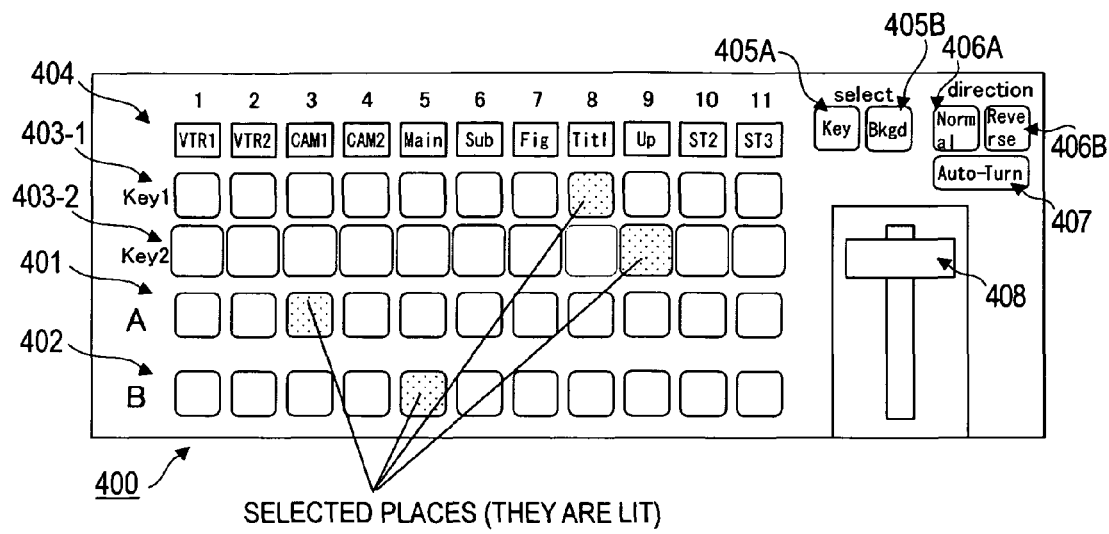
FIG. 10 is a diagram depicting the appearance of a console of the switcher.

FIG. 10 shows a diagram depicting the appearance of the console 400 of the switcher 41. The console 400 is a manipulating unit corresponding to one of the image processing units of the main unit 440 when the mode is not dual link mode. When the mode is dual link mode, the console 400 is a manipulating unit corresponding to the paired image processing units.

As shown in FIG. 10, the console 400 is provided with first background buttons 401, second background buttons 402, and key buttons 403-1 and 403-2. In addition, the console 400 is provided with source name indicators 404, transition target buttons 405A and 405B, direction specifying buttons 406A and 406B, a round-trip mode specifying button 407, and a fader lever 408.

The first background buttons 401 are manipulated when the first background signal select input bus 415A selects the input line through which the video signals to be background video signals are supplied to the combination circuit 422A. The second background buttons 402 are manipulated when the second background signal select input bus 417A selects the input line through which the video signals to be background video signals are supplied to the combination circuit 422A.

The key buttons 403-1 and 403-2 are manipulated when they select the combination of the first input line and the second line through which the video signals to be key source signals and key fill signals are supplied to the key processing circuits 421A1 and 421A2. In this case, the key source signal select input buses 411A1 and 411A2 supply the video signals to be key source signals to the key processing circuits 421A1 and 421A2 through the first input line. In addition, the key fill signal select input buses 413A1 and 413A2 supply the video signals to be key fill signals to the key processing circuits 421A1 and 421A2 through the second input line.

In FIG. 10, the source name indicators 404 displays text information associated with the index number corresponding to the button number of the button arranged below. Text information is stored in the control unit 430, and a user can set text information. In addition, text information may be stored as associated with the input line number. In this case, any one item of text information associated with the first input line number corresponding to the index number corresponding to the button number of the button and text information associated with the second input line number corresponding to the index number is displayed.

The first input line number is a number to select the video signal to be the key fill signal, and the second input line number is a number to select the video signal to be the key source signal. Thus, a pair of the first input line number and the second input line number is associated with the index number corresponding to the button number. Therefore, the key buttons can select the combination of the first and second input lines through which the video signals to be the key source signal and the key fill signal are supplied to the key processing circuit.

When the background buttons are manipulated, the background video signal is selected by the first input line number. Such a scheme may be possible that the source name indicator 404 generally displays text information associated with the first input line number, and displays text information associated with the second input line number only while a separately provided button, not shown, is pressed down. Thus, the operator can confirm text information of the first and second line numbers. In addition, associations of the index number corresponding to the button number and the input line number corresponding to the index number are called cross-points button assignments. On the console 400, the selected button (switch) is lit.

In the broadcast programming delivery control system 100, the NRCS block 20 obtains channel assignment information acquired from the playout server 31, and automatically selects the cross-points (XPT) of the switcher 41 set in the playlist in the automation control block 10. In other words, according to the MOS protocol, channel assignment information in the playout server 31 is passed to the NRCS block 20.

The automation control block 10 obtains channel assignment information in the playout server 31 by means of roStorySend according to the MOS protocol or FTP. Then, the automation control block 10 sets and changes the cross-points of the switcher 41 based on channel assignment information.

Figure 11:
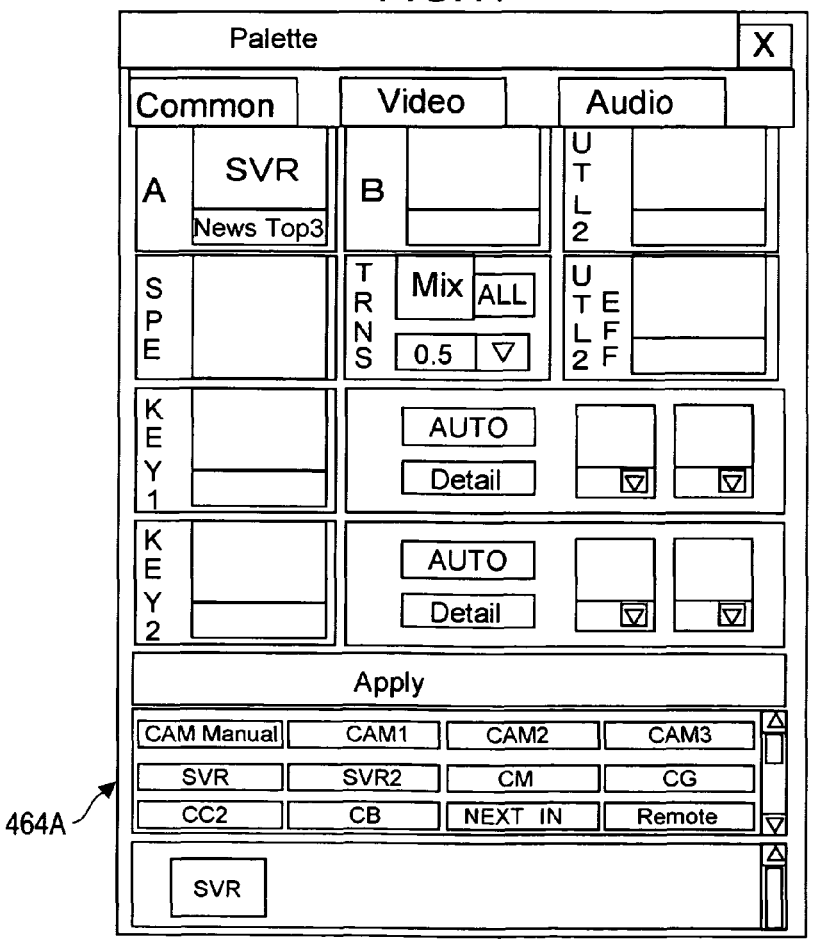
FIG. 11 is a diagram depicting a palette selected by SVR through the console.

In creating a playlist, when video sources are selected, the setting is made as only the playout server 31, and no channel is set. In other words, on the display screen of the graphical display 464, when SVR is selected on a palette 464A shown in FIG. 11, SVR is set on a playlist 464B shown in FIG. 12. However, no channel is set. When the automation control block 10 obtains channel information from the NRCS block 20, the automation control block 10 displays channel information in the playout server 31 on the playlist to set the cross-points of the switcher 41.

In other words, in the broadcast programming delivery control system 100, the automation control block 10 installed in the first computer unit 110 executes the playlist. In this case, the automation control block 10 references to information about the material passed from the NRCS block 20, channel assignment information and the playlist, when the playout server 31 enters the state of outputting a certain material from the output channel.

Then, the automation control block 10 conducts a process of instructing a proper bus of the switcher 41 to select an input connected to the output channel of the playout server 31 in accordance with the material select schedule in the playlist and the process schedule of the switcher 41. For example, when a certain material is used as background video in the playlist, for the proper bus, any one of the background signal select input buses is fit, and then an instruction is made to select the corresponding input in the cross-points.

Alternatively, when a material for subtitles is keyed, the corresponding input is selected at the cross-points of the key source signal select input bus and the key fill signal select input bus, and then the material is used. Alternatively, when a sub-picture area is provided according to picture in picture, the corresponding input is selected by the key fill signal select input bus to obtain video signals of a material. Then, the video signals are subjected to compression, key signals only for the sub-picture area generated inside the key processing circuit, and the sub-picture area is formed for keying without using video signals from an external unit through the key source signal select input bus.

Then, on the display part of the source name indicators 404 on the console 400 of the switcher 41 at the position corresponding to an operator to select an input connected to the output channel of the playout server 31, information about the material obtained from the first computer unit 110 is displayed. Here, the operator to select the input connected to the output channel of the playout server 31 is the first background buttons 401, the second background buttons 402, and the key buttons 403-1 and 403-2.

In the control unit 430, the switcher 41 has a correspondence storage unit capable of setting correspondences between the operators of the console 400 and the corresponding inputs of the switcher 41. The first computer unit 110 sends an instruction about the above-described correspondence for the input of the switcher 41 scheduled for use in the program through the output channel of the playout server 31, and assigns the correspondence to the operator of the console 400. In addition, the instruction about the correspondence includes material information, and this material information is displayed on the source name indicator 404 as corresponding to the operator of the console 400 in this example.

In addition, other than the relation to the playout server 31, material servers such as the video clip server 43 and the audio clip server 44 may similarly change the correspondence also in changing a material outputted from a certain output channel.

1-7. Specific Example of Broadcast Programming Delivery

Next, a specific example of broadcast programming delivery in the broadcast programming delivery control system 100 will be described. Here, suppose that the output channels of the material server are CH1 and CH2. Then, materials outputted from the output channels CH1 and CH2 are supposed to be clip A, clip B, and clip C. The output channels CH1 and CH2 of the material server are supposed to be connected to the inputs 1 and 2 of the switcher 41. In addition, in the playlist (cue sheet), materials are used in the order shown in Table 1 in image processing conducted by the switcher 41. In this case, an example is shown that the progress of the playlist follows time of day.

TABLE 1

|  | Time | | | | |
| --- | --- | --- | --- | --- | --- |
|  | t1 | t2 | t3 | t4 | t5 |
| Background | A | B | A | B | A |
| P in P | — | — | — | — | B |
| Subtitle | — | — | C | C | — |

In other words, although the number of channels for use at the same time is two channels, three types of materials are used. Although the delivery control computer executes the above-described playlist, materials are outputted in the order shown in Table 2 because the number of the output channels of the material server is two. This detail is output channel information for the entire time of day.

TABLE 2

|  | Time | | | | |
| --- | --- | --- | --- | --- | --- |
|  | t1 | t2 | t3 | t4 | t5 |
| Ch1 | A | B | C | C | A |
| Ch2 | — | — | A | B | B |

Because the control of the switcher 41 is instructed as input 1 and input 2, the order is shown in Table 3.

TABLE 3

|  | Time | | | | |
| --- | --- | --- | --- | --- | --- |
|  | t1 | t2 | t3 | t4 | t5 |
| Input 1 | A | B | C | C | A |
| Input 2 | — | — | A | B | B |

Consequently, to the switcher 41, instructions are made in the order shown in Table 4. In addition, in Table 4, the numbers indicate the input numbers.

TABLE 4

| | Time | | | | |
|---|---|---|---|---|---|
| | t1 | t2 | t3 | t4 | t5 |
| Background | 1 | 1 | 2 | 2 | 1 |
| P in P | — | — | — | — | 2 |
| Subtitle | — | — | 1 | 1 | — |

For automatic control, when cross-points control (control of the matrix switcher unit) is executed as discussed above, scheduled pictures can be outputted. Suppose that the possibility that operations are switched to manual operations is taken into account, preferably, material titles (A, B, C) are displayed on source name displays corresponding to the cross-points buttons of the console 400 of the switcher 41. In order to implement this, source name information is supplied to the switcher (the system including the console), the associations with material titles are executed. The source name information gives the switcher 41 a title (character string) corresponding to each input.

Table 5 shows inputs of the switcher 41 and exemplary sources (signal sources).

TABLE 5

| Switcher input number | Source |
|---|---|
| 1: | Ch1 of material server 1 |
| 2: | Ch2 of material server 1 |
| 3: | Ch1 of material server 2 |
| 4: | Ch2 of material server 2 |
| 5: | Ch3 of material server 2 |
| 6: | VTR 1 |
| 7: | VTR 2 |
| 8: | Studio camera 1 |
| 9: | Studio camera 2 |
| 10: | Outside broadcast van 1 |
| 11: | Outside broadcast van 2 |
| 12: | Outside broadcast van 3 |

In addition, Tables 6 and 7 show exemplary settings of cross-points button assignments. Here, a single input line number is simply assigned to a button number.

TABLE 6

| Exemplary assignments (no VTR) | | | | | | | |
|---|---|---|---|---|---|---|---|
| | Button number | | | | | | |
| | 1 | 2 | 3 | 4 | 5 | 6 | 7 |
| Input number | 1 | 2 | 8 | 9 | 10 | 11 | 12 |

TABLE 7

| Exemplary assignments (no outside broadcast van) | | | | | | | |
|---|---|---|---|---|---|---|---|
| | Button number | | | | | | |
| | 1 | 2 | 3 | 4 | 5 | 6 | 7 |
| Input number | 1 | 2 | 8 | 9 | 6 | 7 | 3 |

For example, in assignments in Table 6, because input line number 1 is assigned to button number 1, for instance, "CH1 of the material server 1" is displayed on the indicator corresponding to button number 1 in accordance with Table 5. In addition, for example, "outside broadcast van 1" is displayed on the indicator corresponding to button number 5.

As described above, instructions are made from the automation control block 10 installed in the first computer unit 110 such that only signal sources for use in a broadcast programming are assigned to buttons. Depending on types of the playout server 31, it is difficult to continuously use the same channel for outputting different materials. Thus, channel assignment control in consideration of this point is necessary.

In this case, for example, even though a program (broadcast programming) uses a single material all the time, two channels (CH1, CH2) are used for operations. For example, in the playout server 31, control is conducted in such a way that material A is outputted from CH1, material B is then outputted from CH2, material C is outputted from CH1, and material A is outputted from CH2.

To the cross-points of the switcher 41, inputs connected to CH1 and CH2 are assigned. Then, in using materials in the progress of the broadcast programming, cross-points are controlled so as to select the corresponding input. Thus, in the broadcast programming, a material used at each point in time is specified, it is unnecessary for operator to be aware from which channel that material is outputted, and the material is correctly selected.

As described above, it is sufficient that the first computer unit 110 acquires from the playout server 31 which material is outputted from which channel with enough lead time to prepare control before the timing of each switching. This acquisition may be made before broadcast programming is started, and it is sufficient that the above-described lead time is kept even though the broadcast programming is ongoing.

Because the automation control block 10 knows materials used in the playlist, the automation control block can identify materials for use from the playlist. In addition, because materials for use are assigned to buttons, even though operations are suddenly moved to manual operations, necessary materials can be selected.

In addition, on the console 400 of the switcher 41, cross-points buttons are generally capable of selecting doubled inputs with the use of a "shift" button. However, because manipulations with pressing the shift button cause time and effort, it is convenient that materials for frequent use are allocated to buttons of smaller numbers, not with the shift button. Even though buttons are provided enough, when inputs for use in the broadcast programming are assigned to buttons of smaller numbers, the ease of manipulation is improved in manual operations.

In addition, even though the automation control block 10 makes cross-points button assignments, because the material title is displayed on the source name indicators 404 on the console 400 of the switcher 41, manual manipulations including VTR1 and VTR2 have no troubles.

1-8. Control Conducted by Control Data of the Switcher Having Information for Specifying a Video Material of the Material Server Next, the case will be described in which cues of the playlist (cue sheet) include control data of the switcher having information for specifying a video material of the material server. In the embodiment, the first computer unit (automation Ctrl PC) 110 conducts control as described below, in conducting control of the switcher 41 by each cue of the playlist (cue sheet).

The first computer unit 110 checks control data of the switcher 41 included in a cue against the channel material information. Then, based on the checked result, the first computer unit 110 allows the input bus of the switcher 41 necessary to have an input of the video material of the material server to select an input line corresponding to the output channel of the material server such as the playout server 31 from which a video material is outputted.

Here, channel material information is information indicating a correspondence of a video material outputted from the individual output channels of the material server. In other words, channel material information is information indicating the correspondences between the individual output channels of the material server and video materials outputted from these output channels. In the embodiment, the first computer unit 110 receives this channel material information from the material server through the second computer unit 120 configuring the NRCS. In addition, such a configuration may be possible that the first computer unit 110 directly receives channel material information from the material server.

Figure 13:
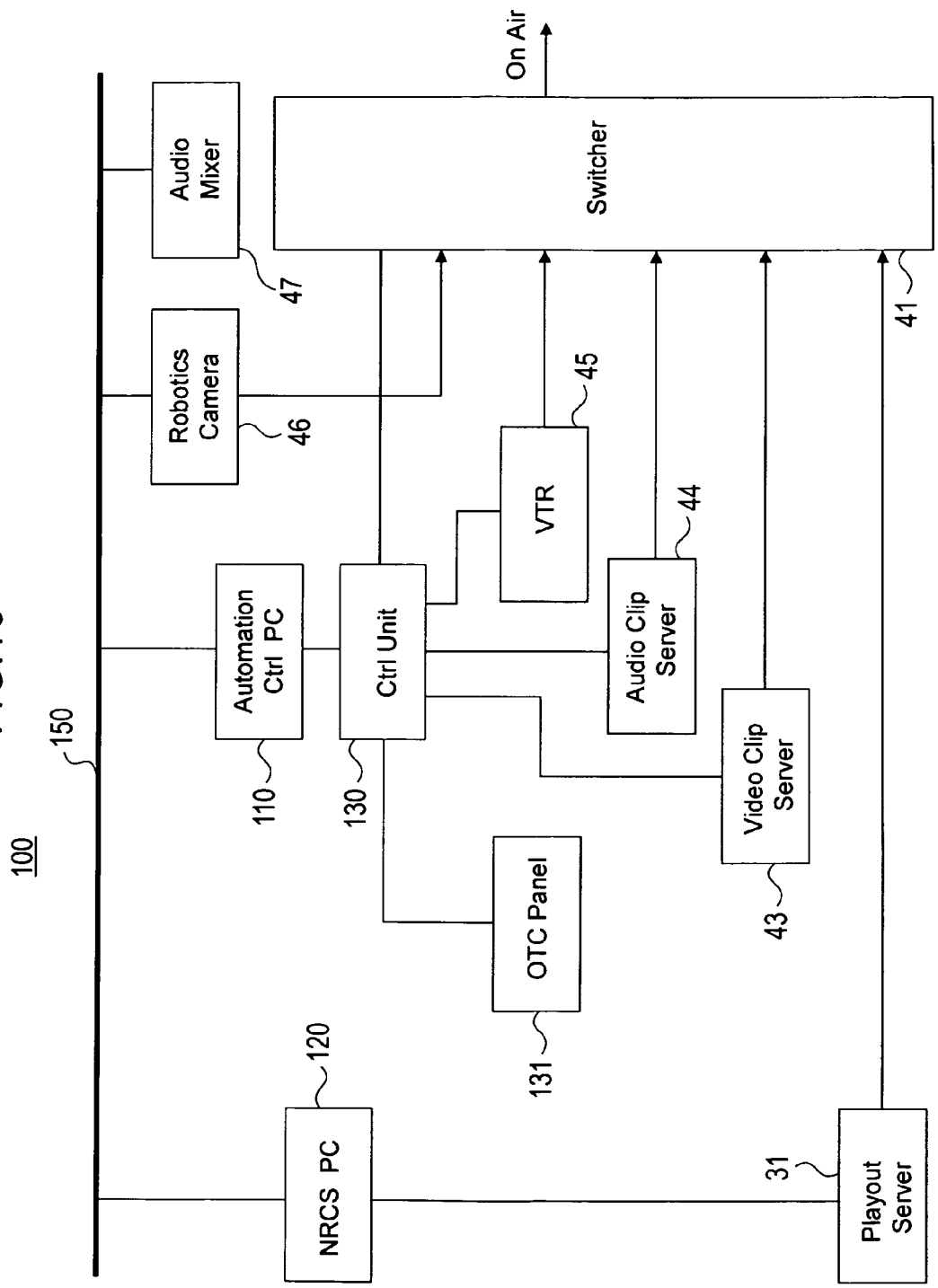
FIG. 13 is a diagram depicting an exemplary configuration of essential units related to function assignments to manipulation buttons of an OTC panel in the broadcast programming delivery control system.

FIG. 13 shows an exemplary partial configuration relating to control conducted by control data of the switcher having information for specifying a video material of the material server in the broadcast programming delivery control system 100 shown in FIG. 1. In FIG. 13, components corresponding to those in FIGS. 1, 2, and 7 are designated the same numbers, and the detailed descriptions are properly omitted.

The second computer unit (NRCS PC) 120 is connected to the first computer unit (automation Ctrl PC) 110, the robotics camera 46, and the audio mixer 47 through the automation network 150.

To the first computer unit 110, the OTC panel 131, the video clip server 43, the audio clip server 44, and the VTR 45 are connected through the control unit 130. The second computer unit 120 is connected to the playout server 31. In addition, output signals of the video clip server 43, the audio clip server 44, the VTR 45, the playout server 31, and the robotics camera 46 are supplied to the switcher 41.

In addition, the first computer unit 110 controls the operations of the switcher 41 through the control unit 130. In addition, the OTC panel 131 is connected to the control unit 130. The OTC panel 131 has a plurality of manipulation buttons, not shown. The operator uses the OTC panel 131 to make manipulations such as switching the contents of a sub-picture on a picture of picture in picture created by the switcher 41, for example, by one-touch manipulations.

In the broadcast programming delivery control system 100 shown in FIG. 13, the playout server 31 as a material server is controlled by the second computer unit (NRCS PC) 120. The first computer unit 110 communicates with the second computer unit 120 to indirectly communicate with the playout server 31. However, for targets to which the invention is applied, configurations are not limited to this configuration. Such a configuration may be possible that the first computer unit 110 directly communicates with the playout server 31.

1-9. Description of the Playlist

The playlist (cue sheet) will be described. In the first computer unit (Automation Ctrl PC) 110, a broadcast programming delivery program called a playlist is stored. The playlist is formed of a plurality of "formations". In addition, this "formation" is also called a cue. A single cue determines one broadcast state, that is, control of the overall broadcasting system at a certain time of day.

In pre-production work of the playlist, the details of control that each cue has are determined. In this case, it may be possible that the formation pattern including a plurality of elements such as video and audio elements is specified to determine all the details of control of the broadcasting system at a certain time of day. For example, the formation pattern is formed of information indicating components such as materials, time information for each element, and information about the order of individual elements.

In the embodiment, this case will be described in which a model is used to determine the details of control of the broadcasting system at a certain time of day. Here, the model is control data for controlling a part of the broadcasting system. For example, a video model includes specifications of control related to video materials. In addition, for example, an audio model includes specifications of audio control. In order to determine control of the overall broadcasting system at a certain time of day, the video model, the audio model, and the other models are specified. The models are used to more flexibly cope with control when it is desired to change part of control, for example, a plurality of image materials configuring the screen.

The first computer unit 110 prepares various models in advance, and stores them in a built-in HDD (Hard Disk Drive), a semiconductor memory such as a flash memory, or the other storage media, for example. In this sense, the first computer unit 110 configures a model creating unit and a model storage unit.

FIG. 14 shows an exemplary model data structure. The model structure is not a single structure. Depending on the area (field) showing which type the model is, the data structures and meanings after that are determined. In FIG. 14, the type is "the switcher", and a part of the model data structure of the switcher is shown. The switcher model holds the details of control of the switcher 41.

In addition to specifying the target ME bank, the memory number of the memory function and the input number selected by each input bus, the switcher model as well stores the control state of the circuit to switch combinations. When the memory function applies control data specified by the memory number, because all the control states of the target ME bank are included in the control data, the other data may be sometimes empty.

FIG. 15 shows another exemplary model data structure. In FIG. 15, the type is "the audio mixer", showing the model data structure of the audio mixer. The audio mixer model holds the details of control of the audio mixer. The audio mixer model stores the specification of the target channel, the sound level, and the control state in stereo mode.

Figure 16:
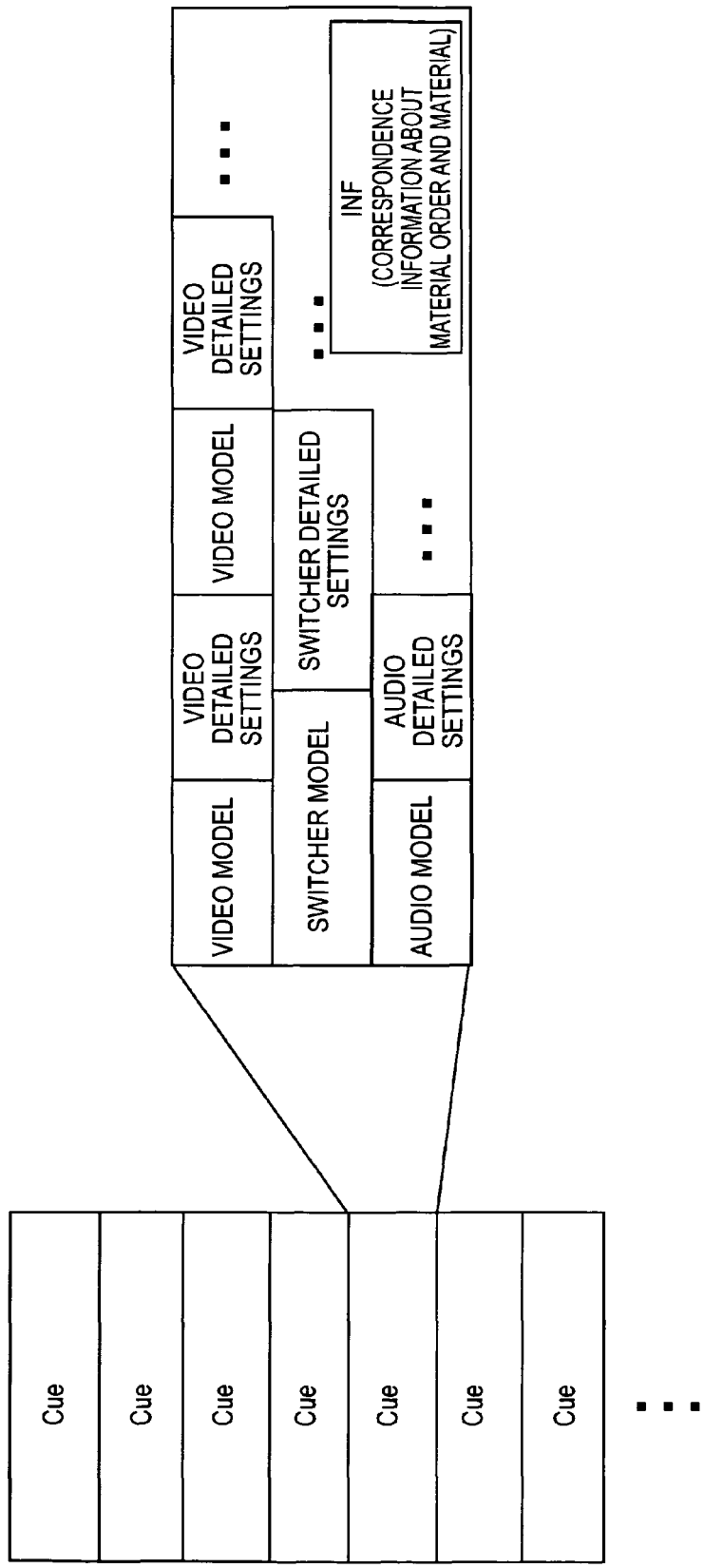
FIG. 16 is a diagram depicting an exemplary data structure of a playlist held by a first computer unit.

FIG. 16 shows an exemplary data structure of a playlist held in the first computer unit 110. The playlist is formed of a plurality of cues in units of cues. Each of the cues holds the details of control (control information) to determine control of the overall broadcasting system at a certain time of day. In operations, the first computer unit 110 in turn calls up the individual cues of the playlist to control broadcast programming delivery.

As shown in the drawing, the cue includes various types of models such as video models, audio models, and switcher models. In addition, the cue additionally includes detailed settings related to particular control, which is not specified only by the model.

The video model specifies which video material (image material) is used. Consequently, based on the video model, the input of the switcher 41 is selected. In this case, some video models directly specify the input number of the switcher 41, and in come cases, the video material of the material server such as the playout server 31 is specified and the specific input number of the switcher 41 is selected in the operation described below.

In the stage of "pre-production" prior to operations, the operator creates an edit of each cue. In this case, the operator creates this edit by using a GUI (Graphical User Interface) screen in the first computer unit 110. In this case, on the GUI screen, various types of multiple models are displayed by icons, and the operator selects a desired model among them, and puts it in the cue. Here, putting a model in a cue means that the details of control (control state) of this model is registered in the cue.

In addition, when a detailed instruction is necessary to control related to this model, an input is made from a setting screen. Consequently, each model and its detailed setting are added to the cue. In addition, as the edit work of the cue, such a scheme may be possible that a certain model is deleted and another model is added, or the detailed setting is changed. In this sense, the first computer unit 110 configures an editing unit.

In order to specify a video material for use in a certain cue, there are two methods. One is a method of putting a video model in a cue. The other is a method of putting the specification of a video material in a switcher model. For an installing method, such a method is also possible that a video model is put in a switcher model.

(1) The method of putting a video model in a cue is conducted in the way of holding data as shown in FIG. 16. The video model includes the target input bus of the switcher and the specification of a material (a material of the material server, or the other various inputs) to be supplied to the input. As shown in FIG. 16, when a single cue includes a plurality of video models, there is also a method in which the order between materials of the material server is indicated by the video model order. It is possible to use the order in the function, described later.

(2) The method of specifying a video material in a switcher model is a method of configuring a switcher model, for example, as shown in FIG. 17. The detail of FIG. 17 will be described later.

(3) The method of putting a video model in a switcher model is a method of nesting models for use. The video model includes the input bus specification of the switcher and the material specification. The video model is nested in the switcher model to handle only the switcher model for easy handling. It is also possible that meanings are provided to the order of storing video models for use in the function, described later.

In addition, these methods are not exclusive methods. The system may be constructed according to such specifications that when a video material is specified in a switcher model, for example, this specification has higher priority, whereas when no specification is provided, a certain video model outside a switcher model is referenced for operation. In addition, also in this case, the order between materials can be defined. For example, suppose that the order in the switcher model is top priority and a certain video model outside the switcher model is placed at a position after the switcher model. Then, this definition provides unique determination.

1-10. Output Material List and Channel Material Information

FIG. 18 shows the correspondences between the output channels of the material server and the input numbers of the switcher. These correspondences are saved in the first computer unit 110 at the point in time at which devices are installed in the system. The first computer unit 110 references to the correspondences to obtain the input number to select on the switcher 41 from the output channel of the material server.

In control data of the switcher included in the cue of the playlist, a video material of the material server is sometimes specified instead of the input number of the switcher 41. When the input of the switcher 41 is controlled based on the cue, it is necessary for the first computer unit 110 to know in advance from which channel of the material server that video material is outputted.

When the playlist is executed, in order to allow the material server to output the video material included in the cue, the first computer unit 110 sends an output material list to the material server such as the playout server 31 through the second computer unit 120. In response to this, the material server sends channel material information to the first computer unit 110 through the second computer unit 120 in the stage in which the allocations of the output channels are determined. Channel material information is information indicating from which channel of the material server each of the video materials in the output material list is outputted.

Thus, the first computer unit 110 can know the output channel of the material server from which the video material for use in each cue is outputted.

FIG. 19 shows an exemplary output material list sent from the first computer unit 110 to the material server. The first line in FIG. 19 shows the case in which a certain cue whose name is "30__2Box-2SVR" includes video materials whose material IDs are "3224", "5683", and "2781" as material specifications according to a video model. In addition, the second line in FIG. 19 shows the case in which a certain cue whose name is "21_SVR-full" includes a video material whose material ID is "6212" as the material specification according to a video model, for example.

In the output material list shown in FIG. 19, each of the video materials is ordered. The first computer unit 110 sends the output material list as shown in FIG. 19 to the material server through the second computer unit 120. When the video model specifies a line directly coming from the camera 46 to the switcher 41, other than a line from the material server, for example, this case is not included in the output material list because this line is not related to the material server.

In addition, in the stage of pre-production, the first computer unit 110 stores correspondence information INF between the order (the ordinal numbers) of materials such as material 1, material 2, and so on, and these materials (material IDs) in the corresponding cue in the playlist (see FIG. 16). For example, correspondence information INF is information indicating that in a certain cue whose name is "30__2Box-2SVR", video materials whose material IDs are "3224", "5683", and "2781" are ordered by 1, 2, and 3 (ordinal numbers).

FIGS. 20A and 20B show exemplary channel material information corresponding to the output material list shown in FIG. 19. Channel material information is information indicating the correspondences between the order (numbers) and output channels in the output material list.

FIG. 20A shows that in cue "30__2Box-2SVR", video materials of material numbers 1, 2, and 3 are outputted from output channels B, C, and A, respectively. As described above, the first computer unit 110 stores correspondence information INF about the material order (ordinal number) and the material (material ID) in the cue. Thus, the first computer unit 110 can know that certain video materials whose material IDs are "3224", "5683", and "2781" are outputted from output channels B, C, and A, respectively.

In addition, FIG. 20B shows that in cue "21_SVR-full", a video material of material number 1 is outputted from output channel B. As described above, because the first computer unit 110 stores correspondence information INF about the material order (ordinal number) and the material (material ID) in the cue, and consequently, the first computer unit 110 can know that the video material having material ID "6212" is outputted from output channel B.

As described above, in communications between the first computer unit 110 and the material server, when the rule is that the video materials are listed for handling, because the video materials are managed in accordance with the listed order to form channel material information, picture compositions inputted in pre-production work can be reliably reproduced.

1-11. Outline of the Overall Operations

Operator's work in the stage of pre-production and in operations (when a broadcast programming is broadcast) will be described. The stage of pre-production is a stage in which prior to operation of broadcasting, the system is manipulated to store and write various items of data as preparation when there is enough lead time.

The operator manipulates the first computer unit (automation Ctrl PC) 110 and the second computer unit (NRCS PC) 120 to conduct pre-production. The operator manipulates the first computer unit 110 to store devices under its control, that is, control related to devices connected to the first computer unit 110 or the control unit 130 as a playlist.

In this pre-production, each of the devices is actually manipulated to create a certain state, the state is stored in the memory of each of the devices, and the operation of calling up the state is put in a cue. Alternatively, a new model is created which corresponds to such a state. Alternatively, a model is put in a cue to configure the cue.

In addition, the operator manipulates the second computer unit 120 to store control related to devices under its control in the unit 120. The details of storage are a second program, and it is sometimes called a RUNDOWN (NRCS RUNDOWN).

The term "in operations" is a time period for actual broadcasting with regard to broadcasting. When the operation is started, the operator manipulates the GUI of the first computer unit 110 to display a RUNDOWN list of the second computer unit 120, and selects one RUNDOWN from the list. The first computer unit 110 communicates with the second computer unit 120 to display the RUNDOWN list of the second computer unit 120.

When the operator selects one RUNDOWN on the RUNDOWN list, the first computer unit 110 allows the second computer unit 120 to load the RUNDOWN. At the same time, the first computer unit 110 loads one playlist (broadcast programming delivery program) that is held by the first computer unit 110 and corresponds to the RUNDOWN. When the operator inputs "start preparation", the first computer unit 110 sends an instruction to each of the devices, and prepares for execution of the first cue. This is because each of the devices is to be ready for preparation in advance, in order to implement the cue state.

The operator inputs a Take trigger by pressing down a Take button on the OTC panel 131, the first computer unit 110 carries out cues from the beginning cue on the playlist one by one. Then, the first computer unit 110 sends instructions to the devices under its control in accordance with the details of that cue, and implements the control state of the system according to that cue. Devices on the second computer unit 120 side are operated in synchronization with the first computer unit 110. When the first computer unit 110 sends the Take trigger to the second computer unit 120, the corresponding RUNDOWN goes as similar to the playlist of the first computer unit 110.

Figure 21:
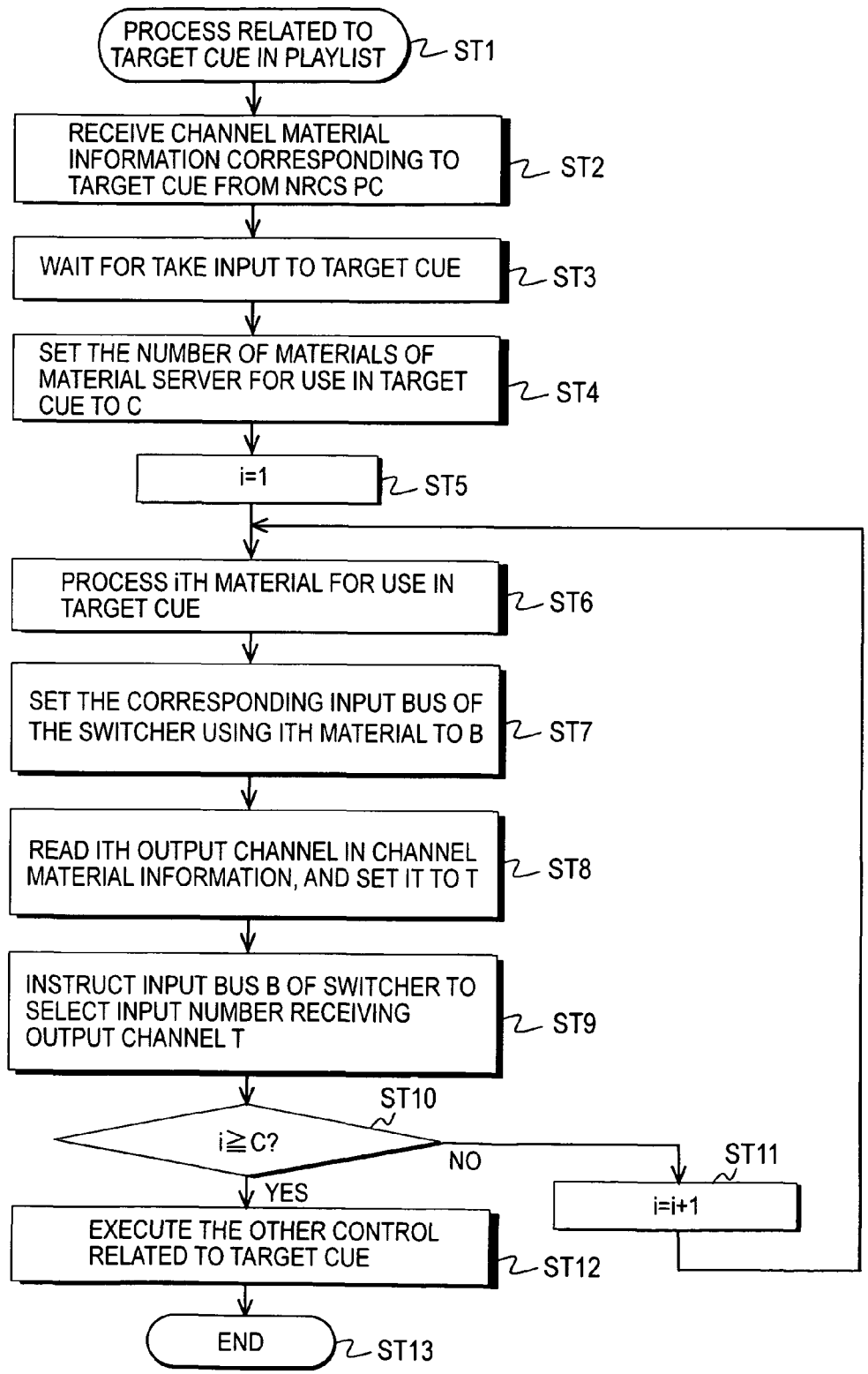
FIG. 21 is a flowchart depicting the process steps when the first computer unit executes a single cue of a playlist.

FIG. 21 shows a flowchart depicting the process steps when the first computer unit 110 executes a single cue in the playlist.

In Step ST1, the first computer unit 110 starts the process, and then moves to the process in Step ST2. In Step ST2, the first computer unit 110 receives channel material information corresponding to a target cue from the second computer unit (NRCS PC) 120. The reception process in Step ST2 occurs at point in time before the target cue is executed. Because the material server determines the assignments of the output channels at the point in time at which all the material outputs in operation are determined, the channel material information is sent at the point in time. However, when a cue at a later time of day is deleted in the midway of operation, assignments are sometimes changed because of the influence. In this case, the information is again sent.

Subsequently, in Step ST3, the first computer unit 110 waits for Take input to the target cue. Then, in Step ST4, the first computer unit 110 sets the number of video materials of the material server for use in the target cue to C. Then, in Step ST4, the first computer unit 110 sets i=1.

Subsequently, in Step ST6, the first computer unit 110 starts the process for the ith video material for use in the target cue. Then, in Step ST7, the first computer unit 110 sets the input bus of the switcher 41 to use the ith video material to B (variable name). Then, in Step ST8, the first computer unit 110 reads the output channel corresponding to the ith material number in channel material information, and sets the output channel to T.

Subsequently, in Step ST9, the first computer unit 110 instructs the switcher 41 that the input bus B selects an input line having the input number to which the output channel T is received, with reference to the correspondences shown in FIG. 18. Then, in Step ST10, the first computer unit 110 determines whether i≥C is held.

When i≥C is not held, because all the video materials of the material server for use in the target cue are not finished for processing, in Step ST11, the first computer unit 110 increments i, and then returns to Step ST6 to start the process for the subsequent video material. On the other hand, when i≥C is held, because all the video materials of the material server for use in the target cue are finished for processing, in Step ST12, the first computer unit 110 executes the other control related to the target cue. For example, the other control is switcher input selection for video materials other than the video materials of the material server, and control other than switcher input selection. After the process in Step ST12, in Step ST13, the first computer unit 110 ends the process.

1-12. Material Number in the Playlist and the Material Number in the Model

Next, the material number in the playlist and the material number in the model will be described. In the exemplary switcher model data structure shown in FIG. 14, the input number is stored for each bus. In contrast to this, in the exemplary switcher model data structure shown in FIG. 17, the ordinal number of each bus is determined in other areas. In other words, in FIG. 17, the bus B is "1", the bus Key 1 is "2", and the bus A is "3".

In this case, control is conducted in such a way that the input number stored in the column of each bus is ignored, and the bus B takes the first material in the material server, the bus Key 1 takes the second material, and the bus A takes the third material in accordance with the ordinal numbers.

In the case of channel material information related to cue "30_2Box-2SVR" in FIG. 20A, control is conducted in such a way that the bus B takes the input number corresponding to the output channel B, the bus Key 1 takes the input number corresponding to the output channel C, and the bus A takes the input number corresponding to the output channel A.

Other than information included in the model, when it is configured to register a plurality of materials (material IDs) used at the same time in the playlist, as described above, the correspondences between a plurality of video materials to be registered in the playlist and video materials in the control data of the switcher 41 according to the model can be made in accordance with the ordinal numbers. Thus, picture compositions inputted in pre-production work can be reliably reproduced without mixing up a plurality of materials.

1-13. Material Number in the Model Icon

In the first computer unit 110, on the GUI screen for creating the edits of the cues in the pre-production stage, various types of multiple models are displayed in icons. FIGS. 22A to 22G are exemplary icons displayed on the GUI screen.

This model (switcher model) is an example of controlling special effects in which three sub-picture areas are arranged on the background picture area. It shows exemplary icons that tell by intuition how sub-picture areas are seen on the screen (relation between the order (ordinal number) and the picture are arrangement) when three video materials of the material server are used for the sub-picture areas.

As the example shown in the drawing, the ordinal numbers (1, 2, 3) are displayed in the icons, whereby the operator can know by intuition that a video material specified at the so-and-so-manieth falls in which sub-picture area in specifying video materials. Therefore, in the manipulation of specifying a video material by a video model after the operator select an icon to specify a switcher model, the operator can correctly select a material for creating a desired image.

Figure 22A:
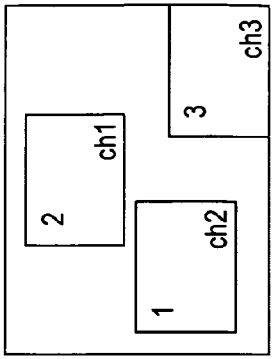
FIGS. 22A to 22G are diagrams depicting exemplary icons displayed on a GUI screen for editing and creating cues in a pre-production stage.
Figure 22B:
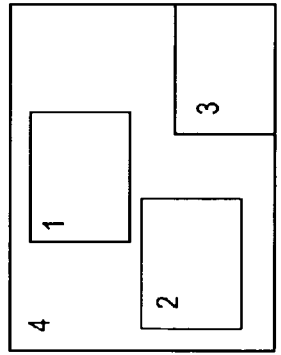
Figure 22C:
Figure 22D:
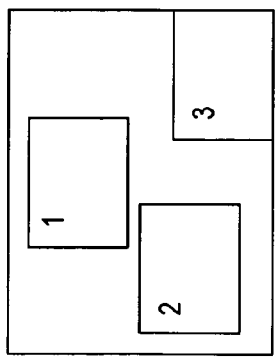
Figure 22E:
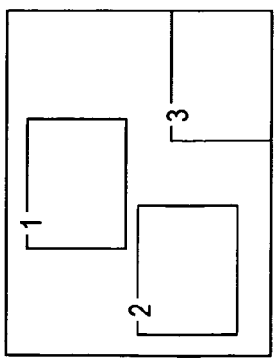
Figure 22F:
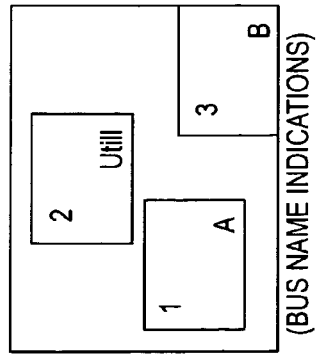

Icons indicated by "special effects channel indications" in FIG. 22F indicate the corresponding channel of a special effects device included in the switcher, the special effects device that resizes down the individual sub-picture areas and arranges them at their positions. Such representation is effective when manual manipulations are added to the control state created by the playlist for fine tuning. The operator can know by seeing the icon which channel is manipulated to change the position of which sub-picture area.

Figure 22G:
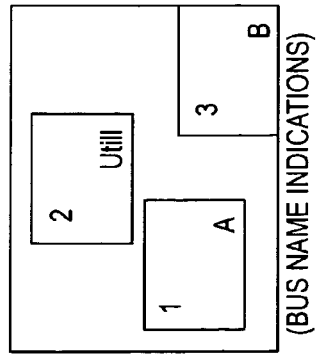

Icons indicated by "bus name indications" shown in FIG. 22G indicate the bus names of the switcher 41 through which images of the individual sub-picture areas is supplied in the icons. Thus, when the operator conducts manual manipulations, the operator can know by seeing the icon that the image of which sub-picture area is switched by manipulating input select (cross-points control) of which bus.

1-14. Sort Rules in the Model

In the descriptions above, the advantages of handling model icons with the assignments of order to sub-picture areas are described. However, suppose that there is regularity how to assign the order, the operator can recognize the order much easier to facilitate editing of cues.

As one method, there is a method in which coordinate values (x, y) for arranging a plurality of video materials forming the picture on the picture area are used to order (sort) sub-picture areas. According to this method, simple, unique ordering can be conducted.

FIGS. 23A to 23D show exemplary ordering of sub-picture areas. In this example, basically, sub-picture areas having smaller y-values are in turn numbered on the upper left of the screen, for example. In this case, as shown in FIG. 23A, when there are multiple sub-picture areas having the same y-value, sub-picture areas having smaller x-values are in turn numbered on the upper left of the screen. In addition, in this case, as shown in FIG. 23D, when there are multiple sub-picture areas having the same y-value and the same x-value on the upper left of the screen, sub-picture areas having greater values are in turn numbered. In this case, because the sub-picture areas are laid on each other, number indication is moved to the position at which the number is seen.

1-15. Order Incorporation in the Model

In the operation of the switcher 41 by control data held in the switcher model, the picture area is composed in the still state of the sub-picture areas, and in some cases, motions are involved as transition (picture transition) according to the installed pattern (special effects pattern) of the switcher 41. FIGS. 24A to 24F show exemplary operations of installed patterns.

Figure 24A:
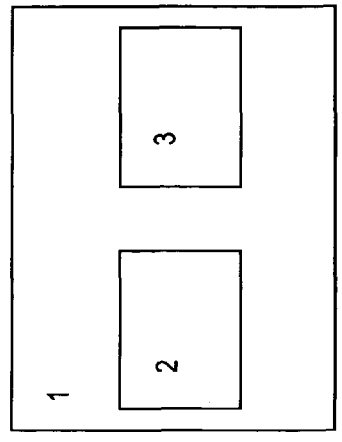
FIGS. 24A to 24F are diagrams depicting exemplary operations of patterns (special effects patterns) installed in the switcher.
Figure 24B:
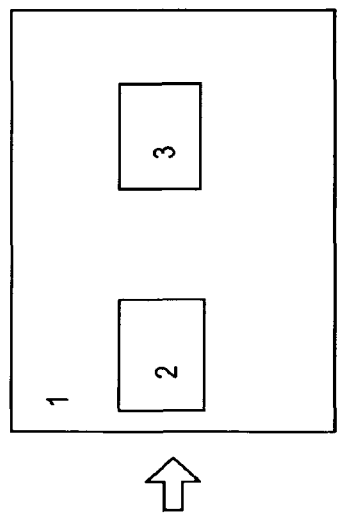
Figure 24C:
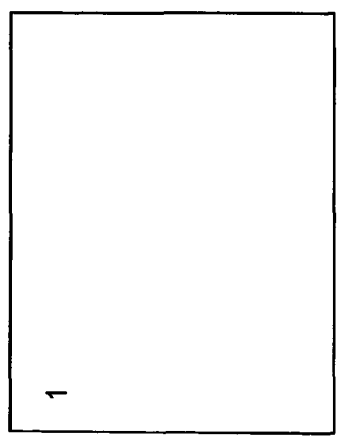
Figure 24D:
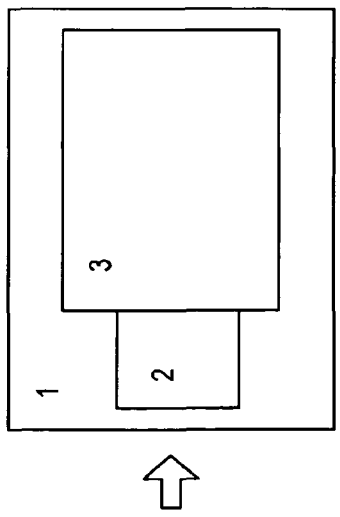
Figure 24E:
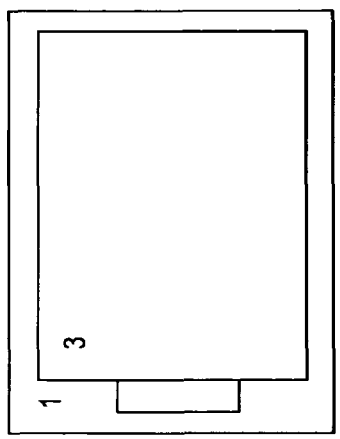
Figure 24F:
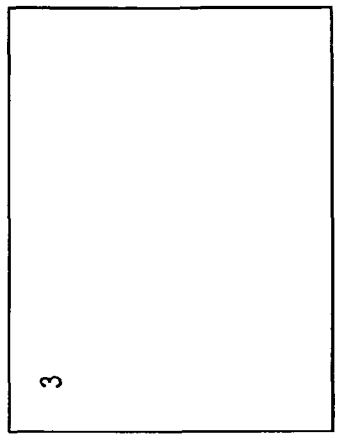

In the beginning, as shown in FIG. 24A, the entire picture area shows a single picture 1 from a studio camera, for example. From this state, the picture area is changed by the operation of the installed pattern. In other words, as shown in FIG. 24B, a picture 2 and a picture 3 are superposed on the picture 1. After that, as shown in FIG. 24C, both of the picture 2 and the picture 3 are resized up, and as shown in FIGS. 24D and 24E, the picture 3 is grown to cover the picture 2. Then, as shown in FIG. 24F, in the final picture, the entire picture area is composed of only the picture 3.

In this case, when the coordinates of a sub-picture area are simply used to order this sub-picture area, it is difficult to determine at which point in time in the motion the coordinates are to be used, and the ordering of the sub-picture area is not uniquely determined. The installed patterns are installed when factory shipment of the switcher 41. Then, the order of pictures for use are attached and stored in the installed patterns from the beginning.

For example, when video materials of the material server are used for the picture 2 and the picture 3 in the installed patterns shown in exemplary operations in FIGS. 24A to 24F, the order is the order of the picture 2 and the picture 3. Thus, the order of materials for use can be uniquely determined with communications and control of the material server even though the picture area is continuously changed according to the operation of the installed patterns.

1-16. Order Registration in the Model

For the transition patterns used in the switcher 41, the patterns installed when factory shipment are used as well as user patterns created by the operator to program the operations are used. In the case of the user pattern, at first, order of pictures does not exist. Thus, there are needs of a scheme of inputting order of pictures by the operator, and a data structure to store the inputted order. In this case, the first computer unit 110 configures a bus number storage unit and a bus number editing unit.

FIG. 25 shows an exemplary data structure for storage. As shown in FIG. 25, for every pattern number, the order is stored for each bus used by that pattern. In the example shown in the drawing, for the user pattern of a pattern number 1001, the order (ordinal number) of the bus A (a picture that uses a video material of the bus A) is "1", and the order of the bus B (a picture that uses a video material of the bus B) is "2".

In addition, in the example shown in the drawing, for a user pattern of a pattern number 3001, the order of the bus A is "1", the order of the bus B is "4", the order of the bus of Util 1 is "2", and the order of the bus DME-Util is "3". In addition, in the example shown in the drawing, for a user pattern of a pattern number 1911, the order of the bus A is "1", the order of the bus B is "3", and the order of the bus of Util 1 is "2".

FIG. 26 shows an exemplary GUI display for allowing the operator to input order of pictures for the user pattern.

A pattern number for a user pattern is an option. When the operator selects one of the pattern numbers, buses used in that pattern are listed on the list on the right side. The operator selects one among the listed buses, and manipulates an "up" or "down" button to change the order of the buses.

The GUI is manipulated to change the order of the buses in the details of storage shown in FIG. 25 for the user pattern among the patterns. Because the installed patterns are not allowed to change, only the pattern number of user patterns can be selected on the GUI shown in FIG. 26.

As described in FIGS. 24A to 24F, the order provided to the input bus is ignored when inputs selected by the individual buses come from other than the material server, only buses taking outputs of the material server are used for ordering. For example, for a pattern number 1911 shown in FIG. 25, the order is the bus A, the bus Util 1, and the bus B. When a picture that the bus Util 1 takes comes from the studio camera, not from the material server and pictures that the bus A and the bus B take come from the outputs of the material server, these pictures are used in the output material list and channel material information, as a material that the bus A takes is used at first, and a material that the bus B takes is used secondly.

1-17. NRCS Configuration

In the broadcast programming delivery control system 100 shown in FIG. 13, the playout server 31 as the material server is controlled by the second computer unit (NRCS PC) 120. The first computer unit (automation Ctrl PC) 110 communicates with the second computer unit 120 to indirectly communicate with the playout server 31.

In this configuration, data called RUNDOWN (NRCS RUNDOWN) is stored on the second computer unit 120 side. The RUNDOWN corresponds to the playlist (broadcast programming delivery program) on the first computer unit 110 side. The RUNDOWN is a "program" related to control of the devices handled on the second computer unit 120 side.

In this configuration, the devices on the second computer unit 120 side are controlled according to the RUNDOWN, and the devices controlled by the first computer unit 110 are controlled according to the playlist (broadcast programming delivery program). Then, both of the programs are executed in synchronization with each other, whereby comprehensive control of the overall broadcast programming delivery control system 100 is implemented.

FIGS. 27A and 27B partially show RUNDOWNS (NRCS RUNDOWNS). The RUNDOWN holds the cue names of the playlist so as to synchronize with the playlist on the first computer unit 110 side. FIG. 27A shows an exemplary RUNDOWN when created. A page column shows items, and in order to specify a material, one page column is used. Thus, for materials for use at the same time, such page names as 100A and 100B are provided to an item 100 to indicate that the pages are used at the same time. In other words, materials "3224", "5683", and "2781" are used at the same time.

As shown in FIG. 27A, at the time at which the RUNDOWN is created, it is unknown which output channel of the material server outputs which material. Which output channel of the material server is used for the individual materials depends on the previous operating state of the output channel of the material server. On this account, in the material server, after a series of operations is specified, from which output channel the individual materials are outputted is not determined. In addition, a material output is sometimes added in the midway of broadcast programming even after the operations are started. In this case, the assignments of materials after that to the output channel are changed.

Therefore, assignments of the output channel (the column of "delivery CH") are not determined until the system is in operation (on the air). FIG. 27B shows an exemplary RUNDOWN in operation. In the column of "delivery CH", the output channel A, B or C for use is stored, which is determined in operation.

The second computer unit (NRCS PC) 120 obtains information about the determined output channel from the material server to complete the RUNDOWN. Subsequently, the second computer unit 120 organizes the correspondences between materials and output channels in the individual pages into channel material information shown in FIGS. 28A and 28B, and sends the channel material information to the first computer unit (automation Ctrl PC) 110. In addition, in FIGS. 28A and 28B, the page names are used for identification. However, the cue names of the playlist on the first computer unit 110 side are used to obtain the same result by the communication arrangements with the first computer unit 110.

The reason why the second computer unit (NRCS PC) 120 is separated from the first computer unit (automation Ctrl PC) 110 is chiefly because of historical context, or economical reasons of a broadcast station to install the system, not because of pure technique reasons. The second computer unit (NRCS PC) 120 is installed before, and the system on the first computer unit (automation Ctrl PC) 110 side is installed later for automation or consolidation of control of the switcher 41.

Figure 29:
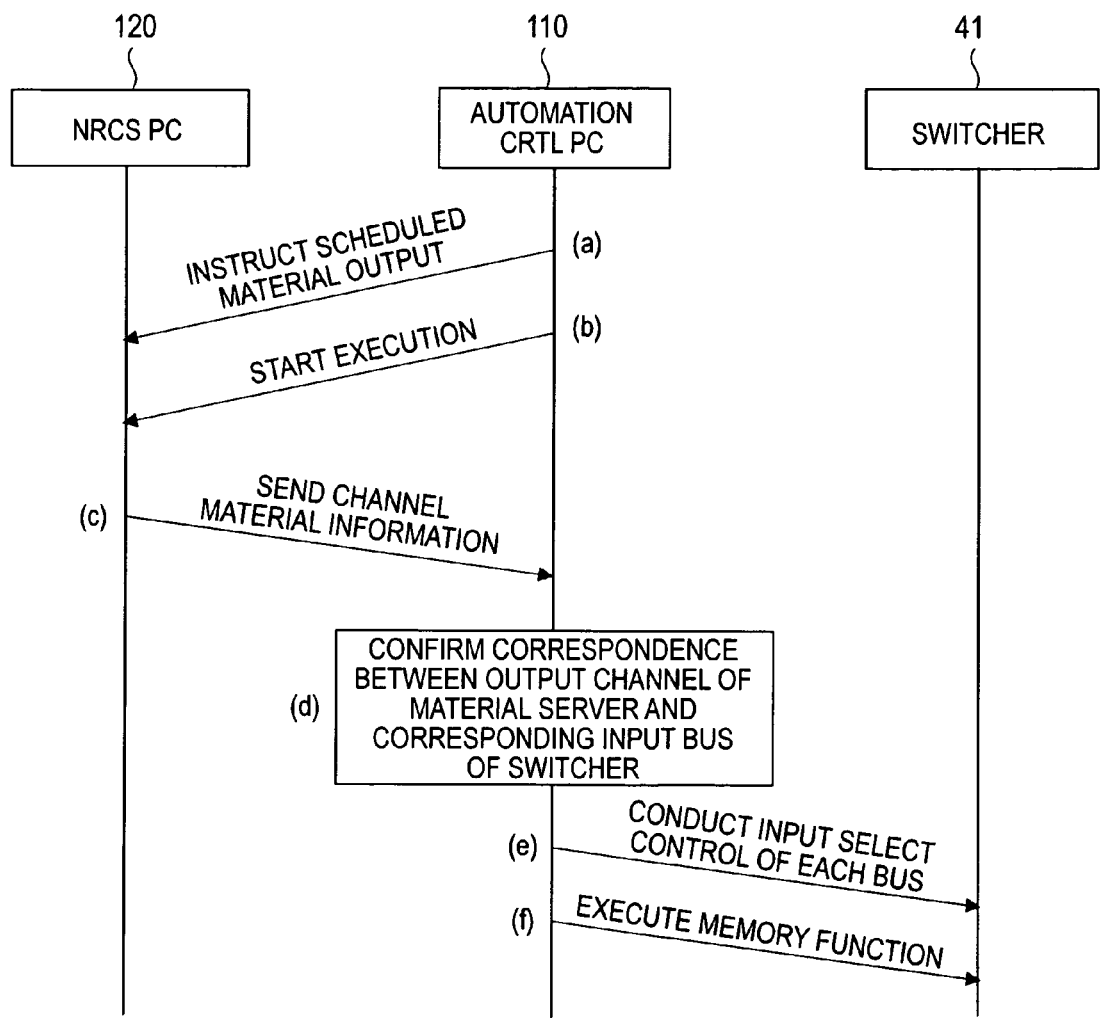
FIG. 29 is a diagram depicting communication sequences in the operations of broadcasting.

FIG. 29 is a diagram depicting the communication sequence in the operations of broadcasting. The first computer unit (automation Ctrl PC) 110 sends the output material list to the second computer unit (NRCS PC) 120 (a). When the operation is started, the first computer unit 110 sends an execution trigger to the second computer unit 120 (b). The second computer unit 120 sends the determined channel material information to the first computer unit 110, before or after the execution trigger (c).

In addition, when a change is made in the future output material list and the first computer unit 110 instructs this change, for example, assignments of the output channels are also changed. On this account, the second computer unit 120 sometimes again sends channel material information of the result to the first computer unit 110.

When the first computer unit 110 receives channel material information, the first computer unit 110 confirms the correspondence between the output channel of the material server and the corresponding input bus of the switcher 41 (d). Then, the first computer unit 110 conducts input select control of each bus according to the input number of the switcher 41 corresponding to the output channel of the material server (e). In addition, the first computer unit 110 conducts various control operations such as execution of the memory function, and implements the broadcast state of the system according to the cues (f).

1-18. Configuration of the NRCS Plug-in

In the embodiment, in the second computer unit (NRCS PC) 120, software is installed, which edits the playlist (broadcast programming delivery program) in the first computer unit (automation Ctrl PC) 110. When this software is not installed, work performed by the second computer unit 120 and work performed by the first computer unit 110 are necessary to conduct pre-production of the overall system.

In other words, it is necessary that the second computer unit 120 edits the RUNDOWN (NRCS RUNDOWN) to create the control schedule of the devices under its control. In addition, it is necessary that the first computer unit 110 edits the playlist (broadcast programming delivery program) to create the control schedule of the devices under its control. In this manner, because it is necessary to perform work at two places, time and effort are required and it is likely to increase wrong correspondences.

In the second computer unit 120, the software is installed to see the edit screen of the RUNDOWN and the edit screen of the playlist on the first computer unit 110 side at the same time by the GUI multiwindow function. Thus, the operator easily and visually recognizes the correspondences to improve the ease of manipulation.

Figure 30:
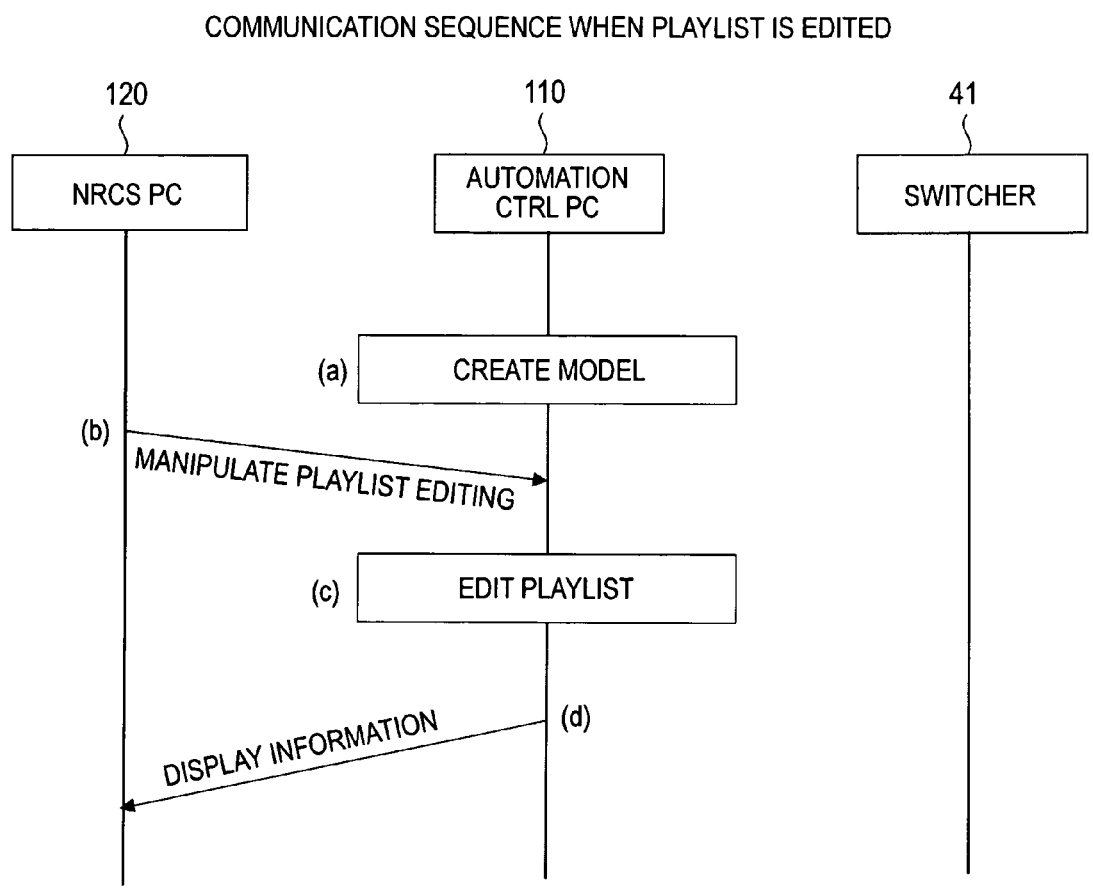
FIG. 30 is a diagram depicting the outline of communication sequences when the second computer unit (NRCS PC) edits a playlist (broadcast programming delivery program) on the first computer unit (Automation Ctrl PC) side.

FIG. 30 shows the outline of the communication sequence when the playlist (broadcast programming delivery program) on the first computer unit (automation Ctrl PC) 110 side is edited on the second computer unit (NRCS PC) 120 side.

In the first computer unit 110, the models created in advance are stored (a). In the second computer unit 120, the cues of the playlist and the icons of usable modes are displayed on the GUI screen (b). In this state, the operator adds a model to the cue, whereby the playlist in the first computer unit 110 is edited (updated) (c). The edited result of the playlist in the first computer unit 110 is reflected on the GUI screen of the second computer unit 120 (d).

In addition, in the embodiment, for provision of another editing method, there are linked operations between the edit screen of the RUNDOWN and the edit screen of the playlist in the first computer unit 110. In this case, associations with the playlist in the first computer unit 110 are stored in the RUNDOWN, whereby the linked editing and broadcasting operations are made possible.

In other words, plug-in software is provided, which is operated on the second computer unit 120. This software displays Quick Cues in the first computer unit 110 on the second computer 120 in icons. Here, the Quick Cue stores a set of the control states of multiple devices under control conducted by the first computer unit 110. Selecting one of the Quick Cues allows creation of one cue of the playlist as it is.

The Quick Cues displayed in icons can be put into the representation of the operating program (RUNDOWN) that is related to the devices under control conducted by the computer unit 120 and displayed by software on the second computer unit 120 side by GUI's drag & drop manipulations. Thus, such a RUNDOWN is created that cue information on the first computer unit 110 side is included in the RUNDOWN on the second computer unit 120 side.

After that, when the RUNDOWN is saved on the second computer unit 120, the second computer unit 120 sends an update notification to the first computer unit 110. For the update notification, a message called roStorySend is used in the MOS protocol. The first computer unit 110 side receives the update notification to add a cue at the corresponding position in the playlist (broadcast programming delivery program) in accordance with the details.

By these operations, the operator can concentrate on editing the RUNDOWN on the second computer unit 120 side, and the edited result is also automatically reflected at the corresponding position in the playlist on the first computer unit 110 side.

As discussed above, in the system 100 shown in FIGS. 1 and 13, the first computer unit 110 conducts control described below when the cue of the playlist (broadcast programming delivery program) includes control data of the switcher having information for specifying the video material of the material server. In other words, the first computer unit 110 checks control data of the switcher (see FIG. 17) against channel material information sent from the material server (see FIGS. 20A and 20B) to conduct input control of the switcher. Therefore, even though a plurality of video materials of the material server is used, picture compositions inputted in pre-production work can be reliably reproduced, and automatic control with no misoperations can be implemented.

In addition, in the system 100 shown in FIGS. 1 and 13, the first computer unit 110 sends the output material list in which the video materials of the material server for use in the individual cues of the playlist are each ordered (see FIG. 19) to the material server, and instructs the output schedule of each of the video materials. Then, the first computer unit 110 receives the channel material information indicating the correspondence between each of the video materials and the output channel (see FIGS. 20A and 20B) from the material server. Channel material information is information indicating the correspondences between the order in the output material list and the output channels. As described above, in communications between the first computer unit 110 and the material server, when the rules handle a plurality of the video materials as listed, materials are managed in accordance with the listed order to form channel material information. Thus, picture compositions inputted in pre-production work can be reliably reproduced.

In addition, in the system 100 shown in FIGS. 1 and 13, in the stage of pre-production, the first computer unit 110 assigns ordinal numbers to multiple video materials of the material server for use at the same time in a predetermined cue of the playlist for registration. In other words, in the stage of pre-production, the first computer unit 110 stores correspondence information between the order (ordinal numbers) of materials such as the material 1, material 2, and so on and these materials (material IDs) in the corresponding cue in the playlist (see FIG. 16). In addition, control data of the switcher 41 that composes a picture with a plurality of video materials and is stored in the model is a data structure to identify a plurality of the materials by ordinal numbers (see FIG. 17). Thus, the correspondences between a plurality of the video materials registered in the playlist and the video materials in the control data of the switcher 41 can be conducted in accordance with the ordinal numbers. Therefore, the output of the material server, the material specification, and control according to the model can be associated with one another, and picture compositions inputted in pre-production work can be reliably reproduced without mixing up a plurality of materials.

In addition, in the system shown in FIGS. 1 and 13, in creating a model, a switcher model, for example, the first computer unit 110 displays the arrangements of a plurality of the video materials for use on the picture area as the ordinal numbers are indicated in model images (see FIGS. 22A to 22G). Therefore, in registration of the control state in the playlist as the model is a manipulation target, the operator can easily recognize the relation between the video materials handled in the playlist and the model, and the ease of manipulation is improved.

In addition, in the system shown in FIGS. 1 and 13, in creating a model, a switcher model, for example, the first computer unit 110 sorts each of the video materials according to the coordinate value by which the video material is arranged on the picture area, and determines the ordinal number of each of the video materials (see FIGS. 23A to 23D). Therefore, even though a plurality of the video materials is handled, the operator easily grasp by intuition the arrangement of each of the video materials on the picture area, and the ease of manipulation is improved.

In addition, in the system shown in FIGS. 1 and 13, in creating a model, a switcher model, for example, the first computer unit 110 assigns the ordinal number to each input bus for use in the switcher 41 for each special effects pattern in advance instructed to the switcher 41. Then, the first computer unit 110 considers that the assigned ordinal number is the ordinal number of each of the video materials selected by the input bus (see FIGS. 24A to 24F, and FIG. 25). Therefore, in preparing the model using the special effects patterns installed in the switcher 41 to edit the playlist, the operator memorizes the order of the video materials for every type of the special effects patterns, whereby the operator can grasp the roles of the individual materials in the special effects patterns, and the ease of manipulation is improved.

In addition, in the system 100 shown in FIGS. 1 and 13, in the second computer unit (the NRCS PC) 120, software to edit the playlist (broadcast programming delivery program) in the first computer unit (automation Ctrl PC) 110 is installed. Thus, in the second computer unit 120, the GUI multiwindow function is used to see the edit screen of the RUNDOWN and the edit screen of the playlist on the first computer unit 110 side at the same time. Therefore, the operator easily and visually recognizes the correspondences to improve the ease of manipulation.

2. Exemplary Modification 2-1. System that does not Select a Material in a First Computer Unit In the embodiment, the specification of video materials outputted from the material server is stored in the cue of the playlist (broadcast programming delivery program) in the first computer unit (automation Ctrl PC) 110 (correspondence information INF in FIG. 16).

However, in the system 100 shown in FIGS. 1 and 13, when the order of materials is known in the playlist, it is unnecessary to store detailed material specification. For example, because the material server is under management of the second computer unit (NRCS PC) 120, the specification of a plurality of materials of the material server and the order assigned to the materials in each cue are held on the second computer unit 120 side.

The operator manipulates the second computer unit 120 to edit the material specification and the order. The second computer unit 120 sends information about the order (ordinal numbers) of the individual materials and the assigned output channels as channel material information to the first computer unit 110. In the first computer unit 110, even though there is no information about the material itself, the input of the switcher 41 to select can be uniquely determined when the correspondences between the ordinal numbers and the output channels are available.

2-2. Association of the Material According to Input Bus Specification

In the embodiment, in handling the video materials of the material server, the materials are managed according to the order. However, association can be provided according to the specification of the input bus of the switcher 41 (buses A, B, Util 1, Key 1, and so on). In this case, in the second computer unit 120, the specification of a plurality of the materials of the material server and the specification of the corresponding input buses of the switcher 41 in each cue are held. The operator manipulates the second computer unit 120 to edit the material specification and the input bus specification.

The second computer unit 120 sends the correspondence between the specification of the input buses of the switcher 41 associated with the individual materials and the assigned output channel as channel material information to the first computer unit 110. In the first computer unit 110, even though there is no information about the material itself, because it is known that the material for use is supplied from which output channel through which bus, the input of the switcher to select can be uniquely determined.

2-3. Model Material Identifier

Next, still another example related to specification and reference of the material will be described. FIG. 31 shows another exemplary model data structure. Bus input columns will be described. A category column indicates the meaning of a subsequent select column. The term "maintain" means that the input that the bus takes remains in the previous state of the cue having the input. Therefore, in this case, the select column has no meaning, and no data is available in the select column. When it is unnecessary to add particular adjustment, a detail column is also empty.

When the category column is "primary input number", the input number of the switcher is stored in the select column as it is. When the category column is specification of server type, an identifier such as a material title is stored in the select column. When the category column is the playout server 1, a character string such as Clip Tag 1 is stored in the select column. This meaning will be described later.

In the example that the category column is Disk Recorder 1, "Title Logo A" that is a material title held by a disk recorder is stored in the select column. In the example that the category column is Server 2, "Animation Fade" that is a material title held in the Server 2 is stored in the select column. This is the same as the material title handled in the Server 2.

The detail column is an area in which detail data related to control of the material or control of the switcher is stored. "Reproduction option" is an input point (start time code) of the material for use. In addition to this, in the detail column, input options may be set for allowing manual operations on the OTC Panel. It is a function that implements OTC Panel button assignments that allow selection of specified inputs for the specified bus at the point in time at which the specified cue is executed (Take).

When the category column is the playout server 1, a character string such as "Clip Tag 1" is stored in the select column. This "Clip Tag 1" is an identifier (use name) to identify a material in the first computer unit (automation Ctrl PC) 110.

FIG. 32 shows an exemplary output material list sent from the first computer 110 to the playout server 1 (the playout server 31). A material to be specified to cue "Cue-Name-1" is stored by the identifier in the first computer unit 110. On the other hand, for specification of a material actually outputted from the playout server 1, the operator manipulates the second computer unit 120 to make an instruction. In other words, this configuration is different from manipulations in the first computer 110.

FIG. 33 shows titles of actual output materials in the playout server 1, which are set by manipulation of the second computer unit (NRCS PC) 120, corresponding to FIG. 32. In the second computer unit 120, the operator is allowed to specify which actual material in the material server corresponds to an automation tag (identifier) such as Clip Tag described in the output material list. Consequently, the correspondences between automation tags and material titles as shown in FIG. 33 are formed.

For the operator who manipulates the second computer unit 120, when the automation tags are displayed, the operator easily recognizes for which purpose the material is used, which makes selection and specification of materials easier. This is the same in the case in which the playlist on the first computer unit 110 side (broadcast programming delivery program) is displayed on the second computer unit 120.

FIG. 34 shows exemplary channel material information. In this example, the material number (the order in the output material list in FIG. 32) is indicated for the output channel. For another example (another method), a correspondence table between output channels and automation tags may be channel material information.

As described above, such a data structure is formed that information (identifier) to specify a material is included in the model itself, whereby editing the playlist that repeatedly uses picture compositions using the same material is facilitated. In addition, in this case, the output of the material server, the material specification, and control according to the model can be associated with one another, and picture compositions inputted in pre-production work can be reliably reproduced without mixing up a plurality of materials.

The embodiment of the invention can reliably reproduce picture compositions inputted in pre-production work and can implement automatic control with no misoperations when a plurality of materials in a material server is used at the same time, and the embodiment of the invention can be applied to a broadcast programming delivery control system.

It should be understood by those skilled in the art that various modifications, combinations, sub-combinations and alterations may occur depending on design requirements and other factors insofar as they are within the scope of the appended claims or the equivalents thereof.

What is claimed is:

1. A broadcast programming delivery apparatus, comprising:
   a broadcast programming delivery control unit that controls broadcast programming delivery based on a broadcast programming delivery program formed of a plurality of items; and
   a switcher for video signals, the switcher being controlled by the broadcast programming delivery control unit, a material server having a plurality of output channels for outputting video material being connected to predetermined input lines of the switcher,
   wherein the items of the broadcast programming delivery program include control data of the switcher having information for specifying a video material of the material server,
   the broadcast programming delivery control unit receives, from the material server, channel material information indicating video material outputted from each of the output channels of the material server, and checks, in conducting control of the switcher according to each of the items of the broadcast programming delivery program, control data of the switcher included in the item against the channel material information to obtain a correspondence of each of a plurality of video materials, and allows an input bus of the switcher necessary to take an input of a video material of the material server to select one of the input lines corresponding to the output channel of the material server from which the corresponding video material is outputted, and
   the switcher includes key source cross-points formed of switches connected to key source signal select input buses that supply video material inputted to one of the predetermined input lines as a key source signal, key fill cross-points formed of switches connected to key fill signal select input buses that supply video material inputted to another one of the predetermined input lines as a key fill signal, and background cross-points formed of switches connected to background signal select input buses that supply video material inputted to a further one of the predetermined input lines as background signals.

2. The broadcast programming delivery apparatus according to claim 1, wherein the broadcast programming delivery control unit sends an output material list that orders each of video materials indicated by information for specifying a video material of the material server included in control data of the switcher, the control data included in each of the items of the broadcast programming delivery program, to the material server for instructing an output schedule of each of the video materials, and the channel material information received by the broadcast programming delivery control unit from the material server is information indicating a correspondence between the order in the output material list and the output channel.

3. The broadcast programming delivery apparatus according to claim 1, further comprising:
   a processor operable as:
      an editing unit having a function in which an ordinal number is assigned to each of a plurality of video materials of the material server for use at same time for registration in the broadcast programming delivery program and a model of broadcast programming delivery control is provided as a manipulation target for registration of a control state in the broadcast programming control program,
   wherein control data of the switcher stored in the model for composing a picture with a plurality of video materials of the material server is a data structure that identifies the plurality of the video materials in accordance with an ordinal number, and
      by the ordinal number, a correspondence between control data of the switcher and the channel material information is obtained.

4. The broadcast programming delivery apparatus according to claim 3, wherein the editing unit has a function of displaying a picture composition resulted from controlling the switcher according to the model in a model image, in control of the switcher according to the model, an arrangement of a plurality of video materials used for a picture composition on a picture area is displayed by indicating an ordinal number in a model image.

5. The broadcast programming delivery apparatus according to claim 3, wherein the processor is further operable as:
   a model creating unit that creates the model, wherein the model creating unit uses a coordinate value by which a video material is arranged on a picture area to sort each of video materials, and determines an ordinal number of each of the video materials.

6. The broadcast programming delivery apparatus according to claim 1, further comprising:
   a processor operable as:
      an editing unit having a function in which an ordinal number is assigned to each of a plurality of video materials of the material server for use at same time for registration in the broadcast programming delivery program, and a model of broadcast programming delivery control is provided as a manipulation target for registration of a control state in the broadcast programming control program, and
      a model creating unit that creates the model,
      wherein the broadcast programming delivery control unit assigns an ordinal number to each input bus used in the switcher in advance as corresponding to each of special effects patterns instructed to the switcher, when creating a model including specification of a special effects pattern, the model creating unit considers that the assigned ordinal number corresponding to the pattern is an ordinal number of each of video materials selected by the input bus, and for an item of the broadcast programming delivery program including the model, a correspondence between control data of the switcher and the channel material information is obtained by the ordinal number.

7. The broadcast programming delivery apparatus according to claim 6, wherein the processor is further operable as:
   a bus number storage unit that stores an ordinal number assigned to each input bus used in the switcher for each of special effects patterns instructed to the switcher, and
   a bus number editing unit that edits details of storage of the bus number storage unit.

8. The broadcast programming delivery apparatus according to claim 1, further comprising:
   a processor operable as:
      an editing unit that provides a model of broadcast programming delivery control as a manipulation target to register a control state in the broadcast programming control program, and
      a model creating unit that creates the model, wherein control data of the switcher stored in the model for composing a picture with a plurality of video materials is a data structure including an identifier of each of the plurality of the video materials.

9. A control method of a broadcast programming delivery apparatus having a broadcast programming delivery control unit that controls broadcast programming delivery based on a broadcast programming delivery program formed of a plurality of items, the method comprising:

controlling a switcher for video signals, using the broadcast programming delivery control unit, a material server having a plurality of output channels for outputting video material being connected to predetermined input lines of the switcher, wherein the items of the broadcast programming delivery program include control data of the switcher having information for specifying a video material of the material server, the switcher including key source cross-points formed of switches connected to key source signal select input buses that supply video material inputted to one of the predetermined input lines as a key source signal, key fill cross-points formed of switches connected to key fill signal select input buses that supply video material inputted to another one of the predetermined input lines as a key fill signal, and background cross-points formed of switches connected to background signal select input buses that supply video material inputted to a further one of the predetermined input lines as background signals;

receiving, from the material server, channel material information indicating respective video material outputted from each of the output channels of the material server;

conducting control, wherein in conducting control of the switcher according to each of the items of the broadcast programming delivery program, control data of the switcher included in the item is checked against the channel material information to obtain a correspondence of each of a plurality of video materials, and an input bus of the switcher necessary to take an input of a video material of the material server is allowed to select one of the input lines corresponding to the output channel of the material server, from the output channel the corresponding video material is outputted.

10. A non-transitory recording medium storing a computer program product, which can be read in a computer, in a system provided with a broadcast programming delivery computer that controls broadcast programming delivery based on a broadcast programming delivery program formed of a plurality of items, the computer program product allowing the broadcast programming delivery computer to function as:

means for controlling a switcher for video signals, a material server having a plurality of output channels for outputting video material being connected to predetermined input lines of the switcher, wherein the items of the broadcast programming delivery program include control data of the switcher having information for specifying a video material of the material server, the switcher including key source cross-points formed of switches connected to key source signal select input buses that supply video material inputted to one of the predetermined input lines as a key source signal, key fill cross-points formed of switches connected to key fill signal select input buses that supply video material inputted to another one of the predetermined input lines as a key fill signal, and background cross-points formed of switches connected to background signal select input buses that supply video material inputted to a further one of the predetermined input lines as background signals, wherein the items of the broadcast programming delivery program include control data of the switcher having information for specifying a video material of the material server;

means for receiving channel material information indicating respective video material outputted from each of the output channels of the material server from the material server; and means for conducting control, wherein in conducting control of the switcher according to each of the items of the broadcast programming delivery program, control data of the switcher included in the item is checked against the channel material information to obtain a correspondence of each of a plurality of video materials, and an input bus of the switcher necessary to take an input of a video material of the material server is allowed to select an input line corresponding to the output channel of the material server, from the output channel the corresponding video material is outputted.

11. A broadcast programming delivery apparatus, comprising:

a broadcast programming delivery control unit that controls broadcast programming delivery based on a broadcast programming delivery program formed of a plurality of items;

a switcher for video signals, the switcher being controlled by the broadcast programming delivery control unit, a material server having a plurality of output channels for outputting video material being connected to predetermined input lines of the switcher; and a news control system that is connected to the broadcast programming delivery control unit through a communication channel for conducting management and administration related to a news program, wherein the items of the broadcast programming delivery program include control data of the switcher having information for specifying a video material of the material server, the news control system controls the material server to pass channel material information indicating respective video material outputted from each of the output channels of the material server to the broadcast programming delivery control unit, in conducting control of the switcher according to each of the items of the broadcast programming delivery program, the broadcast programming delivery control unit checks control data of the switcher included in the item against the channel material information to obtain a correspondence of each of a plurality of video materials, and allows an input bus of the switcher necessary to take an input of a video material of the material server to select one of the input lines corresponding to the output channel of the material server, from the output channel the corresponding video material is outputted, and the switcher includes key source cross-points formed of switches connected to key source signal select input buses that supply video material inputted to one of the predetermined input lines as a key source signal, key fill cross-points formed of switches connected to key fill signal select input buses that supply video material inputted to another one of the predetermined input lines as a key fill signal, and background cross-points formed of switches connected to background signal select input buses that supply video material inputted to a further one of the predetermined input lines as background signals.

12. The broadcast programming delivery apparatus according to claim 11, further comprising:
- software operated on the news control system,
    wherein the broadcast programming delivery control unit has a broadcast programming delivery program holding unit that holds the broadcast programming delivery program, and
    the software has an edit function that makes access to the broadcast programming delivery program holding unit to update the broadcast programming delivery program held in the broadcast programming delivery program holding unit.

13. The broadcast programming delivery apparatus according to claim 12, further comprising:
- a model storage unit that stores a model of broadcast programming delivery control,
    wherein the software has an edit function that makes access to the broadcast programming delivery program holding unit, and registers a control state of broadcast programming delivery stored in the model in the broadcast programming delivery program, in response to manipulation that selects and adds the model stored in the model storage unit.

14. A broadcast programming delivery apparatus, comprising:
- a broadcast programming delivery control unit that controls broadcast programming delivery based on a broadcast programming delivery program formed of a plurality of items;
- a switcher for video signals, the switcher being controlled by the broadcast programming delivery control unit, a material server having a plurality of output channels for outputting video material being connected to predetermined input lines of the switcher; and
- a news control system that is connected to the broadcast programming delivery control unit through a communication channel for conducting management and administration related to a news program,
    wherein the items of the broadcast programming delivery program include control data of the switcher for specifying a video material of the material server selected by the switcher with a use name, the news control system has an item corresponding to each of the items of the broadcast programming delivery program, and holds a second program that specifies a video material of the material server by an identifier in each item, the news control system holds a correspondence between an identifier of a video material of the material server and the use name, the news control system controls the material server according to the second program, and passes channel material information indicating respective video material outputted from each of the output channels of the material server with the use name to the broadcast programming delivery control unit,
- in conducting control of the switcher according to each of the items of the broadcast programming delivery program, the broadcast programming delivery control unit checks control data of the switcher included in the item against the channel material information to obtain a relation between the use name and the output channel for each of a plurality of video materials, and allows an input bus of the switcher necessary to take an input of a video material of the material server to select one of the input lines corresponding to the output channel of the material server, from the output channel the corresponding video material is outputted, and
- the switcher includes key source cross-points formed of switches connected to key source signal select input buses that supply video material inputted to one of the predetermined input lines as a key source signal, key fill cross-points formed of switches connected to key fill signal select input buses that supply video material inputted to another one of the predetermined input lines as a key fill signal, and background cross-points formed of switches connected to background signal select input buses that supply video material inputted to a further one of the predetermined input lines as background signals.

* * * * *